US010387839B2

(12) United States Patent
Wehrle et al.

(10) Patent No.: US 10,387,839 B2
(45) Date of Patent: Aug. 20, 2019

(54) APPARATUSES, METHODS AND SYSTEMS FOR AUTOMATED ONLINE DATA SUBMISSION

(71) Applicant: MONSTER WORLDWIDE, INC., New York, NY (US)

(72) Inventors: Richard C. Wehrle, Stow, MA (US); Danielle F. Dellovo, North Andover, MA (US)

(73) Assignee: Monster Worldwide, Inc., Weston, MA (US)

( * ) Notice: Subject to any disclaimer, the term of this patent is extended or adjusted under 35 U.S.C. 154(b) by 0 days.

(21) Appl. No.: 14/070,221

(22) Filed: Nov. 1, 2013

(65) Prior Publication Data

US 2014/0052658 A1 Feb. 20, 2014

Related U.S. Application Data

(63) Continuation of application No. 11/695,565, filed on Apr. 2, 2007, now Pat. No. 8,600,931.

(Continued)

(51) Int. Cl.
*G06F 16/00* (2019.01)
*G06Q 10/10* (2012.01)
*G06F 16/9535* (2019.01)

(52) U.S. Cl.
CPC ..... *G06Q 10/1053* (2013.01); *G06F 16/9535* (2019.01)

(58) Field of Classification Search
CPC ........................ G06Q 10/1053; G06F 16/9535
See application file for complete search history.

(56) References Cited

U.S. PATENT DOCUMENTS 4,831,403 A 5/1989 Ishida et al.
4,882,601 A 11/1989 Taniguchi et al.
(Continued)

FOREIGN PATENT DOCUMENTS

CN 104001976 8/2014
EP 1085751 12/2002
(Continued)

OTHER PUBLICATIONS

"Key" Oxford English Dictionary Online, located at <http://dictionary.oed.com>, last accessed on Sep. 23, 2006 (34 pgs).
(Continued)

*Primary Examiner* — Grace Park
(74) *Attorney, Agent, or Firm* — Hanchuk Kheit LLP; Walter G. Hanchuk

(57) ABSTRACT

The disclosure discusses an AODSA tool that assists a user in submitting data responding to an online data posting. An embodiment of the invention is described as a job application utility. The user registers with a central data management system. This may be achieved by uploading a resume and/or manually providing registration data. Alternately, the registration data may be derived from parsing an uploaded resume that is analyzed and stored. In another embodiment, a user may simply answer a series of registration questions to register, while also creating a resume. Once the identifying information is finalized, the user is able to search the broad range of job listings. The user is able to forward identifying information to respond to a job listing by forwarding an uploaded/system created resume to an email address in the job listing or conduct an auto-fill of a linked online job application form.

15 Claims, 13 Drawing Sheets

Related U.S. Application Data

(60) Provisional application No. 60/787,879, filed on Mar. 31, 2006.

(56) References Cited

U.S. PATENT DOCUMENTS

| | | | |
|---|---|---|---|
| 4,910,548 | A | 3/1990 | Taniguchi et al. |
| 4,912,648 | A | 3/1990 | Tyler |
| 5,023,646 | A | 6/1991 | Ishida et al. |
| 5,062,074 | A | 10/1991 | Kleinberger et al. |
| 5,164,897 | A | 11/1992 | Clark et al. |
| 5,168,299 | A | 12/1992 | Taniguchi et al. |
| 5,197,004 | A | 3/1993 | Sobotka et al. |
| 5,218,395 | A | 6/1993 | Taniguchi et al. |
| 5,416,694 | A | 5/1995 | Parrish et al. |
| 5,539,493 | A | 7/1996 | Kusaka |
| 5,663,910 | A | 9/1997 | Ko et al. |
| 5,671,409 | A | 9/1997 | Fatseas et al. |
| 5,740,477 | A | 4/1998 | Kosako et al. |
| 5,805,747 | A | 9/1998 | Bradford |
| 5,832,497 | A * | 11/1998 | Taylor .................... G06Q 10/10 |
| 5,884,270 | A | 3/1999 | Walker et al. |
| 5,931,907 | A | 8/1999 | Davies et al. |
| 5,950,022 | A | 9/1999 | Hagiwara |
| 5,963,949 | A | 10/1999 | Gupta et al. |
| 5,978,767 | A | 11/1999 | Chriest et al. |
| 5,978,768 | A | 11/1999 | McGovern et al. |
| 6,006,225 | A | 12/1999 | Bowman et al. |
| 6,026,388 | A | 2/2000 | Liddy et al. |
| 6,052,122 | A | 4/2000 | Sutcliffe et al. |
| 6,144,944 | A | 11/2000 | Kurtzman, II et al. |
| 6,144,958 | A | 11/2000 | Ortega |
| 6,169,986 | B1 | 1/2001 | Bowman et al. |
| 6,185,558 | B1 | 2/2001 | Bowman et al. |
| 6,226,630 | B1 | 5/2001 | Billmers |
| 6,247,043 | B1 | 6/2001 | Bates et al. |
| 6,249,784 | B1 | 6/2001 | Macke et al. |
| 6,263,355 | B1 | 7/2001 | Harrell et al. |
| 6,272,467 | B1 | 8/2001 | Durand et al. |
| 6,275,812 | B1 | 8/2001 | Haq et al. |
| 6,289,340 | B1 | 9/2001 | Puram et al. |
| 6,304,864 | B1 | 10/2001 | Liddy et al. |
| 6,363,376 | B1 | 3/2002 | Wiens et al. |
| 6,370,510 | B1 * | 4/2002 | McGovern ......... G06Q 10/1053 705/321 |
| 6,385,620 | B1 | 5/2002 | Kurzius |
| 6,401,084 | B1 | 6/2002 | Ortega et al. |
| 6,434,551 | B1 | 8/2002 | Takahashi et al. |
| 6,453,312 | B1 | 9/2002 | Goiffon et al. |
| 6,460,025 | B1 | 10/2002 | Fohn et al. |
| 6,463,430 | B1 | 10/2002 | Brady et al. |
| 6,487,538 | B1 | 11/2002 | Gupta |
| 6,492,944 | B1 | 12/2002 | Stilp |
| 6,502,065 | B2 | 12/2002 | Imanaka et al. |
| 6,516,312 | B1 | 2/2003 | Kraft et al. |
| 6,523,037 | B1 | 2/2003 | Monahan et al. |
| 6,546,005 | B1 | 4/2003 | Berkley et al. |
| 6,563,460 | B2 | 5/2003 | Stilp |
| 6,564,213 | B1 | 5/2003 | Ortega et al. |
| 6,567,784 | B2 | 5/2003 | Bukow |
| 6,571,243 | B2 | 5/2003 | Gupta et al. |
| 6,578,022 | B1 | 6/2003 | Foulger |
| 6,603,428 | B2 | 8/2003 | Stilp |
| 6,615,209 | B1 | 9/2003 | Gomes et al. |
| 6,636,886 | B1 | 10/2003 | Katiyar et al. |
| 6,646,604 | B2 | 11/2003 | Anderson |
| 6,658,423 | B1 | 12/2003 | Pugh et al. |
| 6,661,884 | B2 | 12/2003 | Shaffer |
| 6,662,194 | B1 | 12/2003 | Joao |
| 6,678,690 | B2 | 1/2004 | Kobayashi et al. |
| 6,681,223 | B1 | 1/2004 | Sundaresan |
| 6,681,247 | B1 | 1/2004 | Payton |
| 6,697,800 | B1 | 2/2004 | Jannink et al. |
| 6,701,313 | B1 | 3/2004 | Smith |
| 6,704,051 | B1 | 3/2004 | Takahashi |
| 6,714,944 | B1 | 3/2004 | Shapiro et al. |
| 6,718,340 | B1 | 4/2004 | Hartman et al. |
| 6,745,203 | B1 | 6/2004 | Garg et al. |
| 6,757,691 | B1 | 6/2004 | Welsh et al. |
| 6,769,032 | B1 | 7/2004 | Katiyar et al. |
| 6,781,624 | B1 | 8/2004 | Takahashi |
| 6,782,370 | B1 | 8/2004 | Stack |
| 6,785,679 | B1 | 8/2004 | Dane et al. |
| 6,803,614 | B2 | 10/2004 | Takahashi |
| 6,853,982 | B2 | 2/2005 | Smith et al. |
| 6,867,981 | B2 | 3/2005 | Murohara |
| 6,873,996 | B2 | 3/2005 | Chand |
| 6,904,407 | B2 | 6/2005 | Ritzel |
| 6,912,505 | B2 | 6/2005 | Linden et al. |
| 6,917,952 | B1 | 7/2005 | Dailey et al. |
| 6,853,993 | B2 | 8/2005 | Ortega |
| 6,952,688 | B1 | 10/2005 | Goldman et al. |
| 6,963,867 | B2 | 11/2005 | Ford et al. |
| 6,973,265 | B2 | 12/2005 | Takahashi |
| 7,007,010 | B2 | 2/2006 | Cooper |
| 7,016,853 | B1 | 3/2006 | Pereless et al. |
| 7,043,433 | B2 | 5/2006 | Hejna |
| 7,043,443 | B1 | 5/2006 | Firestone |
| 7,043,450 | B2 | 5/2006 | Velez et al. |
| 7,076,483 | B2 | 7/2006 | Preda et al. |
| 7,080,057 | B2 | 7/2006 | Scarborough et al. |
| 7,089,237 | B2 | 8/2006 | Turnbull et al. |
| 7,096,420 | B1 | 8/2006 | Peikes |
| 7,124,353 | B2 | 10/2006 | Goodwin et al. |
| 7,137,075 | B2 | 11/2006 | Hoshino |
| 7,146,416 | B1 | 12/2006 | Yoo et al. |
| 7,191,176 | B2 | 3/2007 | McCall et al. |
| 7,219,073 | B1 | 5/2007 | Taylor et al. |
| 7,225,187 | B2 | 5/2007 | Dumais et al. |
| 7,249,121 | B1 | 7/2007 | Bharat et al. |
| 7,251,658 | B2 | 7/2007 | Dane et al. |
| 7,292,243 | B1 | 11/2007 | Burke |
| 7,379,929 | B2 | 5/2008 | Meteyer et al. |
| 7,424,438 | B2 | 9/2008 | Vianello |
| 7,424,469 | B2 | 9/2008 | Ratnaparkhi |
| 7,487,104 | B2 | 2/2009 | Sciuk |
| 7,490,086 | B2 | 2/2009 | Joao |
| 7,512,612 | B1 | 3/2009 | Akella et al. |
| 7,519,621 | B2 | 4/2009 | Harik |
| 7,523,387 | B1 | 4/2009 | Greenwald et al. |
| 7,613,631 | B2 | 11/2009 | Walker et al. |
| 7,668,950 | B2 | 2/2010 | Horowitz et al. |
| 7,702,515 | B2 | 4/2010 | Fujino et al. |
| 7,711,573 | B1 | 5/2010 | Obeid |
| 7,720,791 | B2 | 5/2010 | Hyder |
| 7,734,503 | B2 | 5/2010 | Agarwal et al. |
| 7,761,320 | B2 | 6/2010 | Fliess et al. |
| 7,778,872 | B2 | 7/2010 | Kamangar et al. |
| 7,827,117 | B2 | 11/2010 | MacDaniel et al. |
| 7,865,451 | B2 | 1/2011 | Hyder |
| 7,881,963 | B2 | 2/2011 | Chudnovesky |
| 8,195,657 | B1 | 6/2012 | Dellove |
| 8,244,551 | B1 | 8/2012 | Mund |
| 8,321,275 | B2 | 11/2012 | Collins et al. |
| 8,375,067 | B2 | 2/2013 | Hyder |
| 8,433,713 | B2 | 4/2013 | Chen |
| 8,527,510 | B2 | 9/2013 | Chen |
| 8,600,931 | B1 | 12/2013 | Wehrle |
| 8,645,817 | B1 | 2/2014 | Fisher |
| 8,914,383 | B1 | 12/2014 | Weinstein |
| 2001/0034630 | A1 | 10/2001 | Mayer et al. |
| 2001/0037223 | A1 | 11/2001 | Beery |
| 2001/0039508 | A1 | 11/2001 | Nagler et al. |
| 2001/0042000 | A1 | 11/2001 | Defoor, Jr. |
| 2001/0047347 | A1 | 11/2001 | Perell et al. |
| 2001/0049674 | A1 | 12/2001 | Talib et al. |
| 2002/0002479 | A1 | 1/2002 | Almog et al. |
| 2002/0010614 | A1 | 1/2002 | Arrowood |
| 2002/0024539 | A1 | 2/2002 | Eleftheriadis |
| 2002/0026452 | A1 | 2/2002 | Baumgarten et al. |
| 2002/0029269 | A1 * | 3/2002 | McCarty ............. H04L 63/0815 709/225 |
| 2002/0038241 | A1 | 3/2002 | Hiraga |
| 2002/0042733 | A1 | 4/2002 | Lesandrini |

(56) References Cited

U.S. PATENT DOCUMENTS

2002/0045154 A1 4/2002 Wood
2002/0046074 A1 4/2002 Barton
2002/0049774 A1 4/2002 Ritzel
2002/0055867 A1 5/2002 Putnam et al.
2002/0055870 A1 5/2002 Thomas
2002/0059228 A1 5/2002 McCall et al.
2002/0072946 A1 6/2002 Richardson
2002/0091629 A1* 7/2002 Danpour ................ G06Q 30/08 705/38
2002/0091669 A1 7/2002 Puram et al.
2002/0091689 A1 7/2002 Wiens et al.
2002/0095621 A1 7/2002 Lawton
2002/0103698 A1 8/2002 Cantrell
2002/0111843 A1 8/2002 Wellenstein
2002/0116203 A1 8/2002 Cherry
2002/0120506 A1 8/2002 Hagen
2002/0120532 A1 8/2002 McGovern et al.
2002/0123921 A1 9/2002 Frazier
2002/0124184 A1 9/2002 Fichadia et al.
2002/0128892 A1 9/2002 Farenden
2002/0133369 A1* 9/2002 Johnson ................ G06Q 10/10 705/321
2002/0143573 A1 10/2002 Bryce et al.
2002/0156674 A1 10/2002 Okamoto et al.
2002/0161602 A1 10/2002 Dougherty et al.
2002/0169669 A1 11/2002 Stetson
2002/0174008 A1 11/2002 Noteboom
2002/0194056 A1 12/2002 Summers
2002/0194161 A1 12/2002 McNamee et al.
2002/0194166 A1 12/2002 Fowler et al.
2002/0195362 A1 12/2002 Abe
2002/0198882 A1 12/2002 Linden et al.
2003/0009437 A1 1/2003 Seiler et al.
2003/0009479 A1 1/2003 Phair
2003/0014294 A1 1/2003 Yoneyama
2003/0018621 A1 1/2003 Steiner et al.
2003/0023474 A1 1/2003 Helweg-Larsen
2003/0033292 A1 2/2003 Meisel et al.
2003/0037032 A1 2/2003 Neece
2003/0046139 A1 3/2003 Beman et al.
2003/0046148 A1* 3/2003 Rizzi ..................... G06Q 30/02 705/14.54
2003/0046152 A1 3/2003 Colas et al.
2003/0046311 A1 3/2003 Baidya et al.
2003/0046389 A1 3/2003 Thieme
2003/0061242 A1 3/2003 Warmer et al.
2003/0071852 A1 4/2003 Stimac
2003/0093322 A1 7/2003 Sciuk
2003/0125970 A1 7/2003 Mittal et al.
2003/0144996 A1 7/2003 Moore, Jr.
2003/0158855 A1 8/2003 Farnham et al.
2003/0160887 A1 8/2003 Takahashi
2003/0172145 A1 9/2003 Nguyen
2003/0177027 A1 9/2003 DiMarco
2003/0182171 A1 9/2003 Vianello
2003/0182173 A1 9/2003 D'Elena et al.
2003/0187680 A1 10/2003 Fujino et al.
2003/0187842 A1 10/2003 Hyatt
2003/0195877 A1 10/2003 Ford et al.
2003/0204439 A1 10/2003 Cullen
2003/0220811 A1 11/2003 Fan et al.
2003/0229638 A1 12/2003 Carpenter et al.
2004/0030566 A1 2/2004 Brooks
2004/0039627 A1 2/2004 Palms
2004/0064477 A1 4/2004 Swauger
2004/0107112 A1 6/2004 Cotter
2004/0107192 A1 6/2004 Joao
2004/0111267 A1 6/2004 Jadhav et al.
2004/0117189 A1 6/2004 Bennett
2004/0128282 A1 7/2004 Kleinberger et al.
2004/0133413 A1 7/2004 Beringer et al.
2004/0138112 A1 7/2004 Cassart
2004/0148180 A1 7/2004 Pajwani
2004/0148220 A1 7/2004 Freeman et al.
2004/0163040 A1 8/2004 Hansen
2004/0186743 A1 9/2004 Cordero
2004/0186776 A1 9/2004 Llach et al.
2004/0193484 A1 9/2004 Allen
2004/0193582 A1 9/2004 Smyth
2004/0210565 A1 10/2004 Lu
2004/0210600 A1 10/2004 Chand
2004/0210661 A1 10/2004 Thompson
2004/0215793 A1 10/2004 Ryan et al.
2004/0219493 A1 11/2004 Philips
2004/0225629 A1 11/2004 Eder
2004/0243428 A1 12/2004 Black et al.
2004/0267554 A1 12/2004 Bowman et al.
2004/0267595 A1 12/2004 Woodings et al.
2004/0267735 A1 12/2004 Melham
2005/0004927 A1 1/2005 Singer
2005/0033633 A1 2/2005 LaPasta et al.
2005/0033698 A1 2/2005 Chapman
2005/0050440 A1 3/2005 Meteyer et al.
2005/0055340 A1 3/2005 Dresden
2005/0060318 A1 3/2005 Brickman
2005/0080656 A1 4/2005 Crow et al.
2005/0080657 A1 4/2005 Crow et al.
2005/0080764 A1 4/2005 Ito
2005/0080795 A1 4/2005 Kapur et al.
2005/0083906 A1 4/2005 Speicher
2005/0096973 A1 5/2005 Heyse et al.
2005/0097204 A1 5/2005 Horowitz
2005/0114203 A1 5/2005 Savitsky et al.
2005/0125283 A1 6/2005 Fan et al.
2005/0125408 A1 6/2005 Somaroo et al.
2005/0154701 A1 7/2005 Parunak et al.
2005/0154746 A1 7/2005 Liu et al.
2005/0154775 A1* 7/2005 McGinn ............... G06Q 10/107 709/200
2005/0171867 A1* 8/2005 Doonan ................. G06Q 10/10 705/26.4
2005/0177408 A1 8/2005 Miller
2005/0192955 A1 9/2005 Farrell
2005/0210514 A1 9/2005 Kittlaus et al.
2005/0222901 A1 10/2005 Agarwal
2005/0228709 A1 10/2005 Segal
2005/0240431 A1 10/2005 Cotter
2005/0278205 A1 12/2005 Kato
2005/0278709 A1 12/2005 Sridhar et al.
2006/0010108 A1 1/2006 Greenberg
2006/0026067 A1 2/2006 Nicholas et al.
2006/0026075 A1 2/2006 Dickerson et al.
2006/0031107 A1 2/2006 Aihara et al.
2006/0047530 A1 3/2006 So et al.
2006/0069614 A1 3/2006 Agarwal et al.
2006/0080321 A1 4/2006 Horn et al.
2006/0100919 A1 5/2006 Levine
2006/0106636 A1 5/2006 Segal
2006/0116894 A1 6/2006 DiMarco
2006/0133595 A1 6/2006 Ravishankar
2006/0155698 A1 7/2006 Vayssiere
2006/0177210 A1 8/2006 Ichimiya
2006/0178896 A1 8/2006 Sproul
2006/0195362 A1 8/2006 Jacobi et al.
2006/0206505 A1 9/2006 Hyder et al.
2006/0206517 A1 9/2006 Hyder et al.
2006/0206584 A1 9/2006 Hyder et al.
2006/0212349 A1 9/2006 Brady
2006/0212466 A1 9/2006 Hyder et al.
2006/0206448 A1 10/2006 Hyder et al.
2006/0229895 A1 10/2006 Kodger, Jr.
2006/0229896 A1 10/2006 Rosen et al.
2006/0235884 A1 10/2006 Pfenninger
2006/0265266 A1 11/2006 Chen et al.
2006/0265267 A1 11/2006 Chen et al.
2006/0265268 A1 11/2006 Hyder et al.
2006/0265269 A1 11/2006 Hyder et al.
2006/0265270 A1 11/2006 Hyder et al.
2006/0277102 A1 12/2006 Agliozzo
2007/0022188 A1 1/2007 Kohs
2007/0033064 A1 2/2007 Abrahamsohn
2007/0038636 A1 2/2007 Zanghi et al.
2007/0050257 A1 3/2007 Fine
2007/0054248 A1 3/2007 Bare

(56) References Cited

U.S. PATENT DOCUMENTS

| | | | | |
|---|---|---|---|---|
| 2007/0059671 | A1 | 3/2007 | Mitchell | |
| 2007/0100803 | A1 | 5/2007 | Cava | |
| 2007/0162323 | A1 | 7/2007 | Gorham | |
| 2007/0185884 | A1 | 8/2007 | Kantamneni | |
| 2007/0190504 | A1 | 8/2007 | Schwartz et al. | |
| 2007/0203710 | A1 | 8/2007 | Habichler et al. | |
| 2007/0203906 | A1 | 8/2007 | Cone et al. | |
| 2007/0218434 | A1 | 9/2007 | Habichler et al. | |
| 2007/0239777 | A1 | 10/2007 | Toomey | |
| 2007/0260597 | A1 | 11/2007 | Cramer | |
| 2007/0271109 | A1 | 11/2007 | Wang et al. | |
| 2007/0273909 | A1 | 11/2007 | Chen et al. | |
| 2007/0288308 | A1 | 12/2007 | Chen et al. | |
| 2008/0059523 | A1 | 3/2008 | Schmidt et al. | |
| 2008/0133343 | A1 | 6/2008 | Hyder et al. | |
| 2008/0133499 | A1 | 6/2008 | Hyder et al. | |
| 2008/0133595 | A1 | 6/2008 | Hyder et al. | |
| 2008/0140430 | A1 | 6/2008 | Hyder | |
| 2008/0140680 | A1 | 6/2008 | Hyder et al. | |
| 2008/0155588 | A1 | 6/2008 | Roberts et al. | |
| 2008/0249853 | A1 | 10/2008 | Dekel | |
| 2008/0275980 | A1 | 11/2008 | Hansen | |
| 2009/0083235 | A1 | 3/2009 | Joao | |
| 2009/0138335 | A1 | 5/2009 | Lieberman | |
| 2009/0164282 | A1 | 6/2009 | Goldberg | |
| 2009/0198558 | A1 | 8/2009 | Chen et al. | |
| 2010/0082356 | A1 | 4/2010 | Verma et al. | |
| 2011/0060695 | A1 * | 3/2011 | Boyland ............ | G06Q 50/2053 705/327 |
| 2011/0134127 | A1 | 6/2011 | Gundlapalli et al. | |
| 2012/0226623 | A1 | 9/2012 | Jurney et al. | |
| 2014/0244534 | A1 | 8/2014 | Simmons et al. | |

FOREIGN PATENT DOCUMENTS

| | | |
|---|---|---|
| EP | 1596535 | 5/2004 |
| JP | 63-246709 | 10/1988 |
| JP | 6-265774 | 9/1994 |
| JP | 6-313844 | 11/1994 |
| JP | 7-287161 | 10/1995 |
| JP | 8-76174 | 3/1996 |
| JP | 61-62011 | 3/1996 |
| JP | 8-292366 | 5/1996 |
| JP | 8-286103 | 11/1996 |
| JP | 10-26723 | 1/1998 |
| JP | 2001-083407 | 3/2001 |
| JP | 2002203030 | 7/2002 |
| JP | 2002251448 | 9/2002 |
| JP | 2004062834 | 2/2004 |
| JP | 2005321093 | 11/2005 |
| WO | 00/26839 | 5/2000 |
| WO | 0148666 | 2/2001 |
| WO | 0146870 | 6/2001 |
| WO | 2001048666 | 7/2001 |

OTHER PUBLICATIONS

Calishan, T. et al., "Google Hacks" First Printing, pp. 18-24, 33, 288-289, 293-297, Feb. 2003.

Dialog Chronolog., "New Features on DialogWeb TM", Sep. 1998 (2 pgs).

Dialog Information Services, "DialogOnDisc User's Guide", Version 4.0 for Dos, (Jan. 1992) pp. v1, (c), 2-1, 2-2, 3-4, 3-5, 3-9, 3-10, 3-11, 3-15, 3-17, 3-19, 3-21, 4-11, 4-21, 4-22, 4-27, 5-2, 5-7, 5-8, 5-9, 2-10, 5-11, c-2.

Dialog Information Services, "DialogLink for the WindowsTM Operating SystemUser's Guide", (May 1995) Version 2.1 pp. 1-2, 1-3, 4-1, 4-2, 5-2, 5-3.

DialogLink, "DialogLink for Windows and Machintosh: User's Guide", Dec. 1993, Version 2.01, P/ (cover sheet), (3-11).

dictionary.oed.com, "Oxford English Dictionary", 1989-1997, retrieved Sep. 23, 2006, 2nd Ed. (34 pgs).

Genova, Z. et al., "Efficient Summarization of URLs using CRC32 for Implementing URL Switching", Proceedings of the 37th Annual IEEE Conference on Local Computer Networks LCN'02, Nov. 2002 (2 pgs.).

Hammami, M. et al., "Webguard: Web Based Adult Content and Filtering System", Proceedings of the IEEE/WIC Conference on Web Intelligence, Oct. 2003 (5 pgs.).

Lam-Adesina, A.M. et al., "Applying Summarization Techniques for Term Selection in Relevance Feedback", SIGIR'01, ACM Press, Sep. 9, 2001 (9 pgs).

Merriam-Webster.com, "Merriam Webster Thesaurus", located at <http://web.archive.org/web/20030204132348http://www.m-w.com>, visited on Feb. 4, 2003 (7 pgs).

Netcraft, Site Report for "www.dialoweb.com", (May 10, 1998), located at <http://toolbar.netcraft.com/site_report?url=http://www.dialogweb.com> last visited on Sep. 27, 2006, (1 pg).

OED.com, "Definition of prescribed", Dec. 2003, retrieved Mar. 3, 2008, located at <http://dictionary.oed.com/cgi/ent . . . >(2 pgs).

Salton, G., "Abstracts of Articles in the Information Retrieval Area Selected by Gerald Salton", ACM Portal: 39-50 (1986).

Sherman, C. "Google Power, Unleash the Full Potential of Google", McGraw-Hill/Osbourne, Aug. 23, 2005, pp. 42-47, 77, 80-81, 100-107, 328-239, 421-422.

Sugiura, A. et al., "Query Routing for Web search engines: Architecture and Experiments", Computer Networks 2000, pp. 417-429, Jun. 2000, located at www.elsevier.com/locate/comnet.

Thomson Dialog. (2003) "DialogWeb Command Search Tutorial", Dialog Web Version 2.0, located at <http://support.dialog.com/techdocs/dialogweb_command_tutorial.pdf#search=%22dialogweb%22> last visited on Dec. 10, 2002, (23 pgs).

Thomson Products, Extrinsic Evidence of the Common Ownership and Distribution of DialogWeb & DialogOnDisc, located at <http://dialog.com/contacts/forms/member.shtml>, <http://dialog.com/products/platform/webinterface.shtml>, and <http://dialog.com/products/platform/desktop_app.shtml> last visited on Sep. 27, 2006 (3 pgs).

Balabanovic, M. et al. "Fab: Content-Based, Collaborative Recommendation", Communications of the ACM 40(3):66-72, (Mar. 1997).

Kawano, H. et al., "Mondou: Web Search Engine with Textual Data Mining", 0-7803-3905, IEEE, pp. 402-405 (Mar. 1997).

Tanaka, M. et al., "Intelligent System for Topic Survey in MEDLINE by Keyword Recommendation and Learning Text Characteristics", Genome Informatics 11:73-82, (2000).

Donath et al., "The Sociable Web" located at <http://web.web.archive.org/web/19980216205524/http://judith.www.media> visited on Aug. 14, 2003 (4 pgs).

Liu, Yi et al., "Affinity Rank: A New Scheme for Efficient Web Search", AMC 1-85113-912-8/04/0005, pp. 338-339 (May 2004).

Ji, Minwen, "Affinity-Based Management of Main Memory Database Clusters", AMC Transactions on Internet Technology, 2(4):307-339 (Nov. 2002).

Careerbuilder.com "My Job Recommendations," located at <http://www.careerbuilder.com/JobSeeker/Resumes/MyNewJobRecommendationsOrganized.aspx?sc_cmp2=JS_Nav_JobsRecs> visited on Oct. 1, 2007 (2pgs).

Careerbuilder.com "Post Your Resume on Careerbuilder.com," located at <http://www.careerbuilder.com/JobSeeker/Resumes/PostResumeNew/PostYourResume.aspx?ff=2> visited Oct. 1, 2007 (3 pgs).

"Yahoo!_hotjobs" (webpage, published Apr. 1, 2005 and dowmloaded from http://web.archive.org/web/20050401095454/hotjobs.yahoo.com/jobs/ on Dec. 11, 2009.

Greg Linden, Brent Smith, Jeremy York, "Amazon.com Recommendations Item-to_item Collaborative Filtering" IEEE Internet Computing, vol. 7, No. 1, Jan./Feb. 2003: 76-80. University of Maryland. Department of Computer Science. Dec. 2, 2009 <http://www.cs.umd.edu/~samir/498/Amazon-Recommedations.pdf>.

Bettman, James R, "A Threshold Model of Attribute Satisfaction Decisions." Journal of Consumer Research Policy Board, pp. 30-35, 1974.

Notice of Acceptance on Australian patent application No. 2007249205 dated Mar. 12, 2013.

International search report and written opinion for PCT/US2007/068913 dated Nov. 30, 2007.

(56) References Cited

OTHER PUBLICATIONS

International search report and written opinion for PCT/US2007/068914 dated Dec. 7, 2007.
International search report and written opinion for PCT/US2007/068916 dated Feb. 22, 2008.
International search report and written opinion for PCT/US2007/068917 dated Nov. 30, 2007.
Examiner first report on Australian patent application no. 2007249205 dated Jun. 30, 2011.
Examiner's search information statement on Australian patent application No. 2007249205 dated Jun. 29, 2011.
"Commsland: Contractors cut out the middleman." M2 Presswire. Coventry: Nov. 5, 2002, p. 1.
Hayes, heather B. "Hiring on the Fast Track," Federal Computer Week, Falls Church: Jul. 29, 2002, vol. 16, Iss. 26, p. 26.
"Steve Wynn Begins Search for 9000 Employees fro Wynn Las Vegas." PR Newswire. New York: Nov. 8, 2004. p. 4.
M. Balabanovic et al. (Mar. 1997). "Fab: content-Based, Collaborative Recommendation," Communications of the ACM 40(3): 66-72.
Bettrnan, James R, "A Threshold Model of Attribute Satisfaction decisions", Joournsumer Research Policy Board, pp. 30-35 (1974).
"GIGZIG—career Path Explore," PAYSCALE, retrived from the Internet Archive on Jul. 22, 2017. Archived copy www.payscale.com:80/gigzig_about.aspx dated Aug. 11, 2007.
"Salary Survey, Salaries, Wages, Compensation Information and Analysis," PAYSCALE, retrived from the Internent Archive on Jul. 22, 2017. Archived copy of www.payscale.com:80/gigzag_about.aspx dated Oct. 13, 2007.

* cited by examiner

Fig. 2A - System User Data Registration
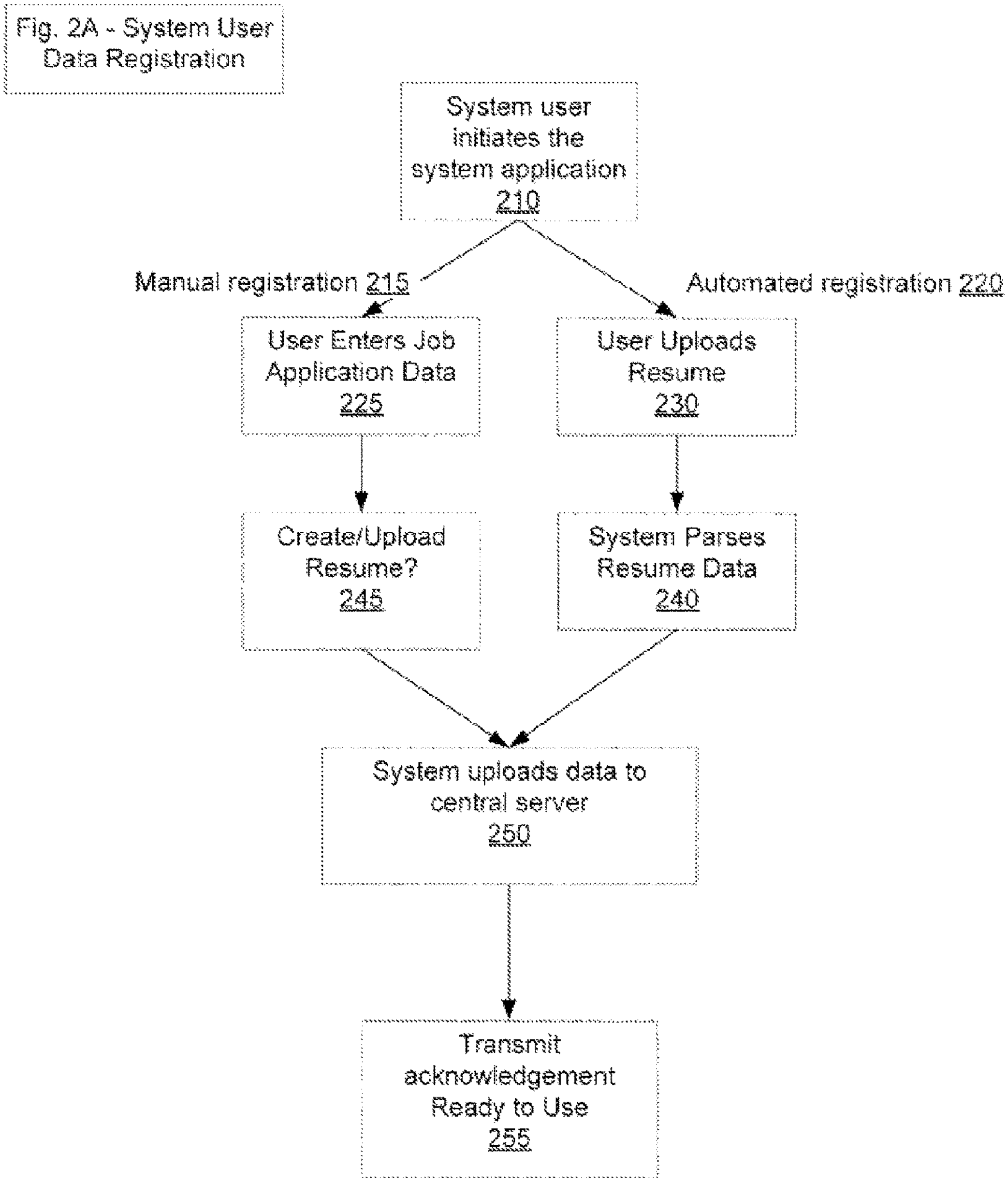

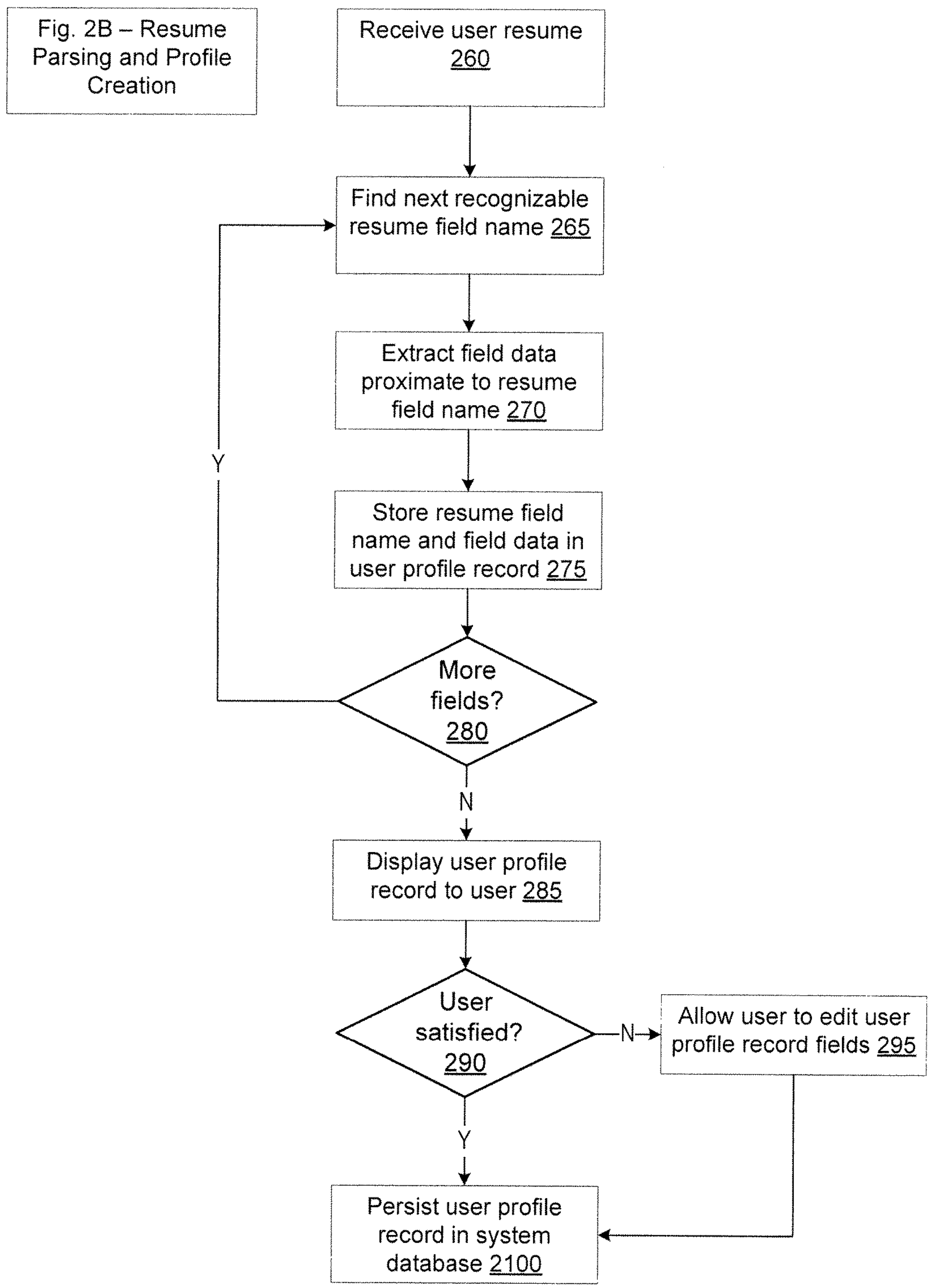
Fig. 2B – Resume Parsing and Profile Creation
Receive user resume 260
Find next recognizable resume field name 265
Extract field data proximate to resume field name 270
Store resume field name and field data in user profile record 275
More fields? 280
Y
N
Display user profile record to user 285
User satisfied? 290
N
Allow user to edit user profile record fields 295
Y
Persist user profile record in system database 2100

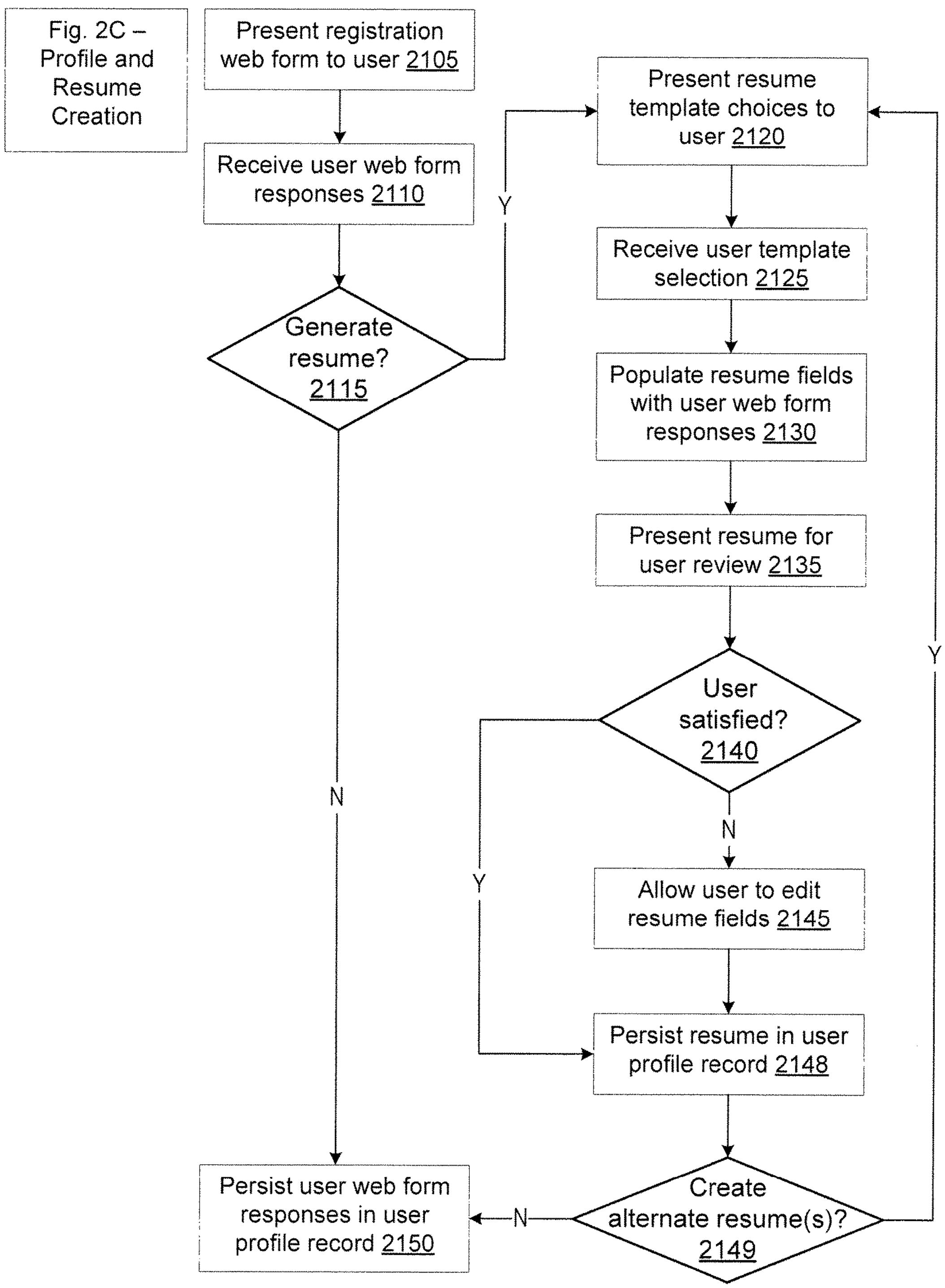
Fig. 2C – Profile and Resume Creation
Present registration web form to user 2105
Receive user web form responses 2110
Generate resume? 2115
Y
N
Present resume template choices to user 2120
Receive user template selection 2125
Populate resume fields with user web form responses 2130
Present resume for user review 2135
User satisfied? 2140
Y
N
Allow user to edit resume fields 2145
Persist resume in user profile record 2148
Create alternate resume(s)? 2149
Y
N
Persist user web form responses in user profile record 2150

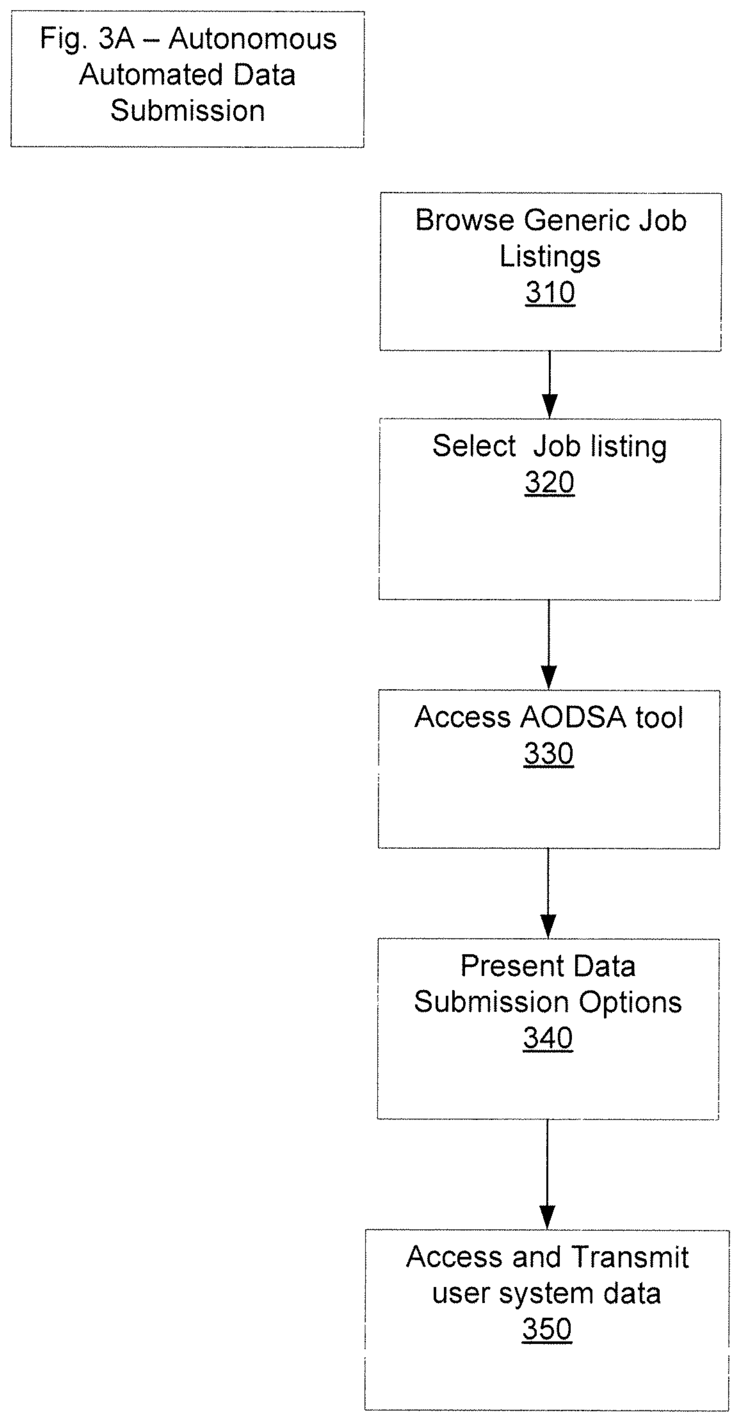
Fig. 3A – Autonomous Automated Data Submission
Browse Generic Job Listings 310
Select Job listing 320
Access AODSA tool 330
Present Data Submission Options 340
Access and Transmit user system data 350

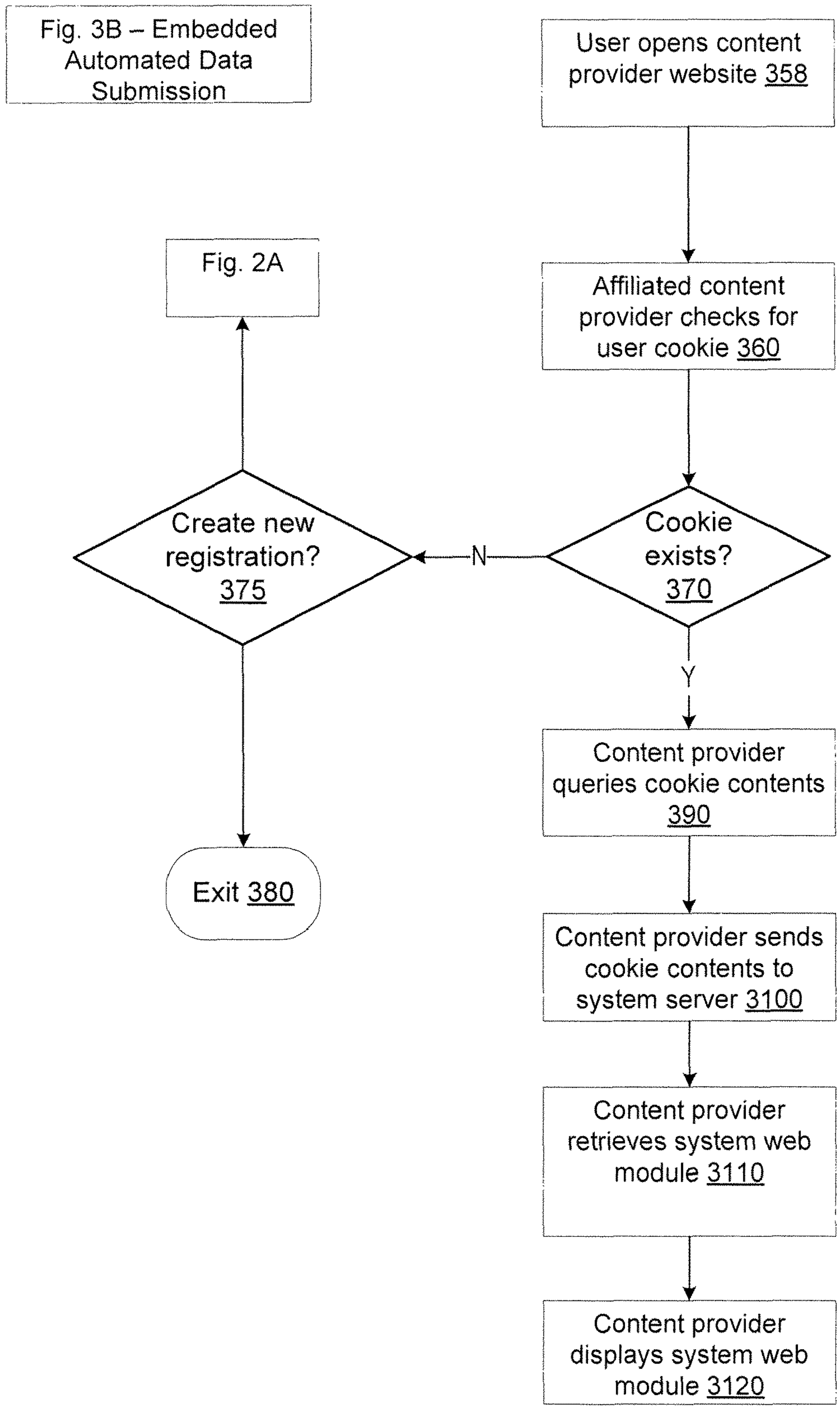
Fig. 3B – Embedded Automated Data Submission
User opens content provider website 358
Affiliated content provider checks for user cookie 360
Cookie exists? 370
N
Y
Create new registration? 375
Fig. 2A
Exit 380
Content provider queries cookie contents 390
Content provider sends cookie contents to system server 3100
Content provider retrieves system web module 3110
Content provider displays system web module 3120

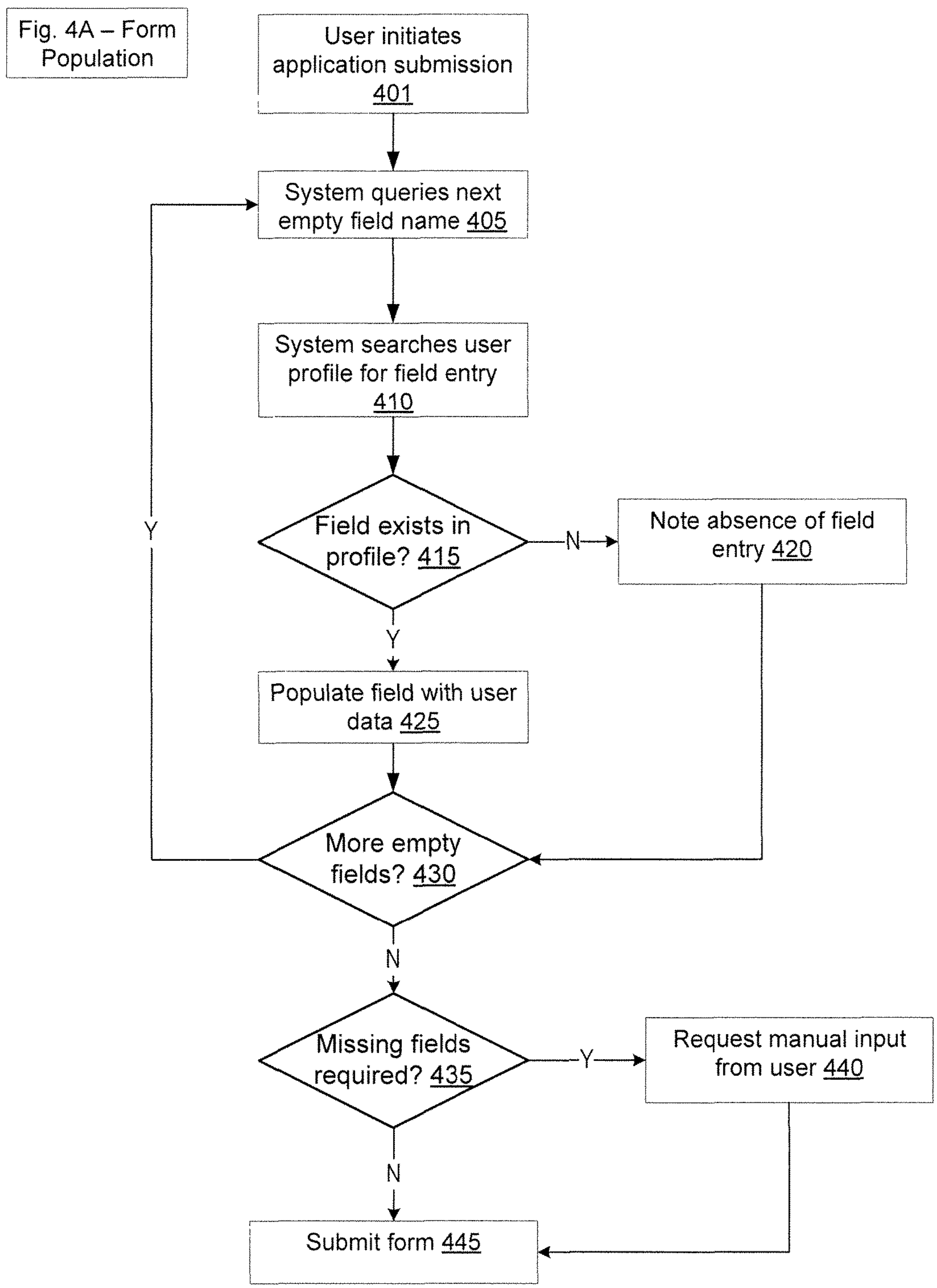
Fig. 4A – Form Population
User initiates application submission 401
System queries next empty field name 405
System searches user profile for field entry 410
Field exists in profile? 415
N
Note absence of field entry 420
Y
Populate field with user data 425
More empty fields? 430
Y
N
Missing fields required? 435
Y
Request manual input from user 440
N
Submit form 445

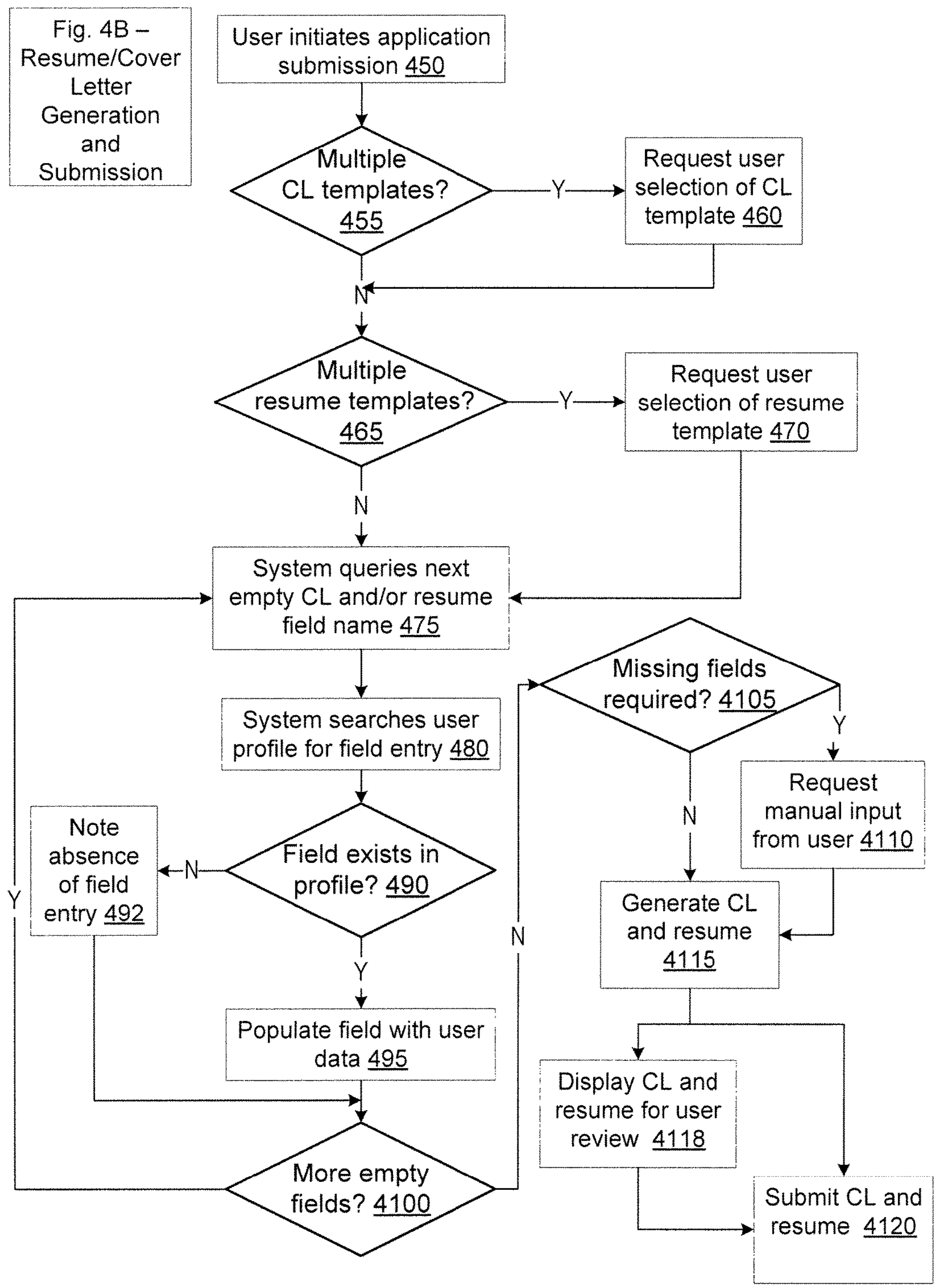
Fig. 4B – Resume/Cover Letter Generation and Submission
User initiates application submission 450
Multiple CL templates? 455
Y
Request user selection of CL template 460
N
Multiple resume templates? 465
Y
Request user selection of resume template 470
N
System queries next empty CL and/or resume field name 475
System searches user profile for field entry 480
Field exists in profile? 490
N
Note absence of field entry 492
Y
Populate field with user data 495
More empty fields? 4100
Y
N
Missing fields required? 4105
Y
Request manual input from user 4110
N
Generate CL and resume 4115
Display CL and resume for user review 4118
Submit CL and resume 4120

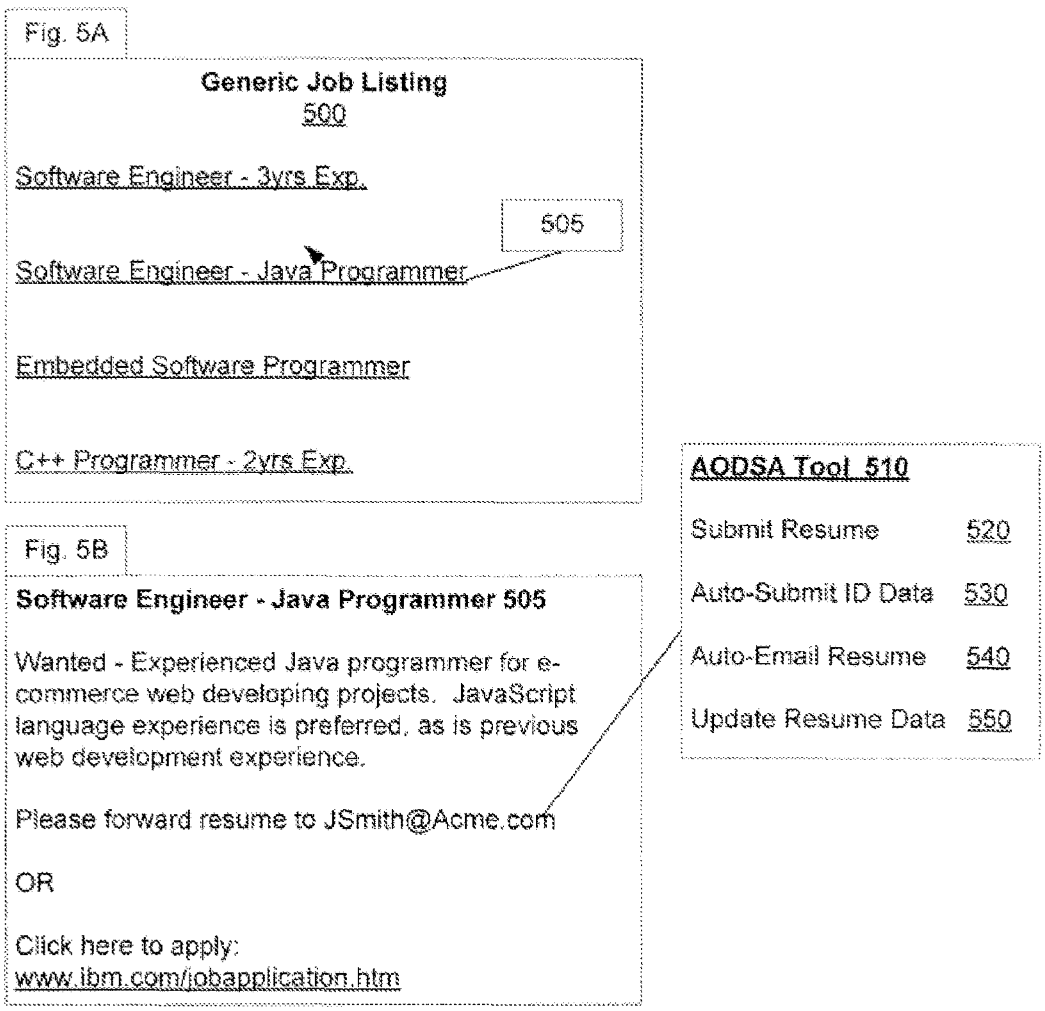
Fig. 5A
Generic Job Listing
500
Software Engineer - 3yrs Exp.
505
Software Engineer - Java Programmer
Embedded Software Programmer
C++ Programmer - 2yrs Exp.
Fig. 5B
Software Engineer - Java Programmer 505
Wanted - Experienced Java programmer for e-commerce web developing projects. JavaScript language experience is preferred, as is previous web development experience.
Please forward resume to JSmith@Acme.com
OR
Click here to apply:
www.ibm.com/jobapplication.htm
AODSA Tool 510
Submit Resume 520
Auto-Submit ID Data 530
Auto-Email Resume 540
Update Resume Data 550

APPARATUSES, METHODS AND SYSTEMS FOR AUTOMATED ONLINE DATA SUBMISSION

PRIORITY CLAIM

This disclosure claims priority under 35 U.S.C. § 120 to U.S. patent application Ser. No. 11/695,565, entitled "Apparatuses, Methods and Systems for Automated Online Data Submission," filed Apr. 2, 2007, which in turn claims priority to U.S. Provisional Patent Application No. 60/787,879 entitled "APPARATUSES, METHODS AND SYSTEMS FOR AUTOMATED ONLINE DATA SUBMISSION," filed on Mar. 31, 2006, the contents of these applications being hereby expressly incorporated in their entirety by reference.

FIELD OF THE INVENTION

The present invention is directed generally to apparatuses, methods, and systems for automated electronic data submission, and more particularly, to an apparatus, method and system for simplifying the job application process.

BACKGROUND

Internet users have two primary options when conducting job searches on the internet. For example, a user may conduct a search of a generic job listing repository where the job listings are simply listed on a website. Alternately, the user may register with a job search site, wherein the job search site acts as a search intermediary between prospective employers and job applicants.

In the generic job repository web site, a user may be limited to browse the internet site reviewing job postings. However, conventional job postings often simply include a web link back to the posting entity's website to a web page that includes details about available job opportunities. The posting entity's website may provide the applicant with initial contact information such as: a human resource person's email address or phone number. Alternately, job listings may contain a link to an online job application form that accepts the applicant's identifying information. The job applicant must overcome significant obstacles simply to start the application process.

Further, some generic job search websites may include coarse database search functionality enabling the job applicant to limit the number of listings the user will browse. Although a user can utilize keywords to assist in targeting the types of listings that are included as search results, the user still manually searches the detailed descriptions of various listed positions to determine which positions to apply for. Once the user decides to apply for a particular job, the user has to overcome the challenges discussed above associated with application submission protocol for the particular posting web site.

In some dedicated job search intermediary web sites, job applicants register with the web site and supply identifying information. Users of such intermediary web sites are generally limited to job listings posted by potential employers who have also registered with the dedicated intermediary. Accordingly, the pool of possible employers and available opportunities is extremely limited when compared with the enormous volume of opportunities available across the internet.

SUMMARY OF THE INVENTION

The disclosure details the implementation of apparatuses, methods, and systems associated with an Automated Online Data Submission/Application (AODSA) process. The AODSA facilitates data submission functionality that enables a user to submit job application data for responding to a wide variety of job application postings. In one embodiment, an automated job application system, such as Monster-In-A-Box, may be configured to operate as a desktop application that runs as a background utility, an application incorporated into a web browser toolbar, or an application that incorporates job search functionality into browser windows with data distributed by an ad server.

The disclosure details how an AODSA assists job applicants by effectively streamlining the initial step in the job application process—submission of an applicant's identifying information. The application enables a job applicant to advantageously centralize their identifying information through interacting with the system or uploading a preformatted resume. The job applicants can actively search for jobs across the breadth of the internet including generic job listing web sites, dedicated intermediaries, as well as web sites that list opportunities within a particular corporation or a particular industry. Advantageously, when the job applicant wants to apply for a position, the AODSA tool facilitates an efficient, expedient submission of application data that significantly streamlines the application process for a job applicant.

The present disclosure details examples of possible implementations of system applications that facilitate an automated submission process. As such, the AODSA tool provides a user with substantial flexibility to utilize the resources associated across the internet and the broad range of posted job opportunities.

BRIEF DESCRIPTION OF THE DRAWINGS

The accompanying drawings illustrate various non-limiting, example, inventive aspects in accordance with the present disclosure:

FIGS. 2A, 2B, and 2C illustrate flow diagrams of resume data registration and user profile creation processes associated with embodiments of the invention;

FIGS. 3A and 3B illustrate flow diagrams associated with resume data submission processes;

FIGS. 4A and 4B illustrate flow diagrams associated with form population and resume/cover letter generation processes;

FIGS. 5A, 5B, and 5C illustrate examples of invocation of the AODSA tool according to embodiments of the invention;

The leading number of each reference number within the drawings indicates the figure in which that reference number is introduced and/or detailed. As such, reference number 101 is first introduced in FIG. 1. Reference number 201 is introduced in FIG. 2, etc.

DETAILED DESCRIPTION

Example AODSA Data Flows

Figure 1:
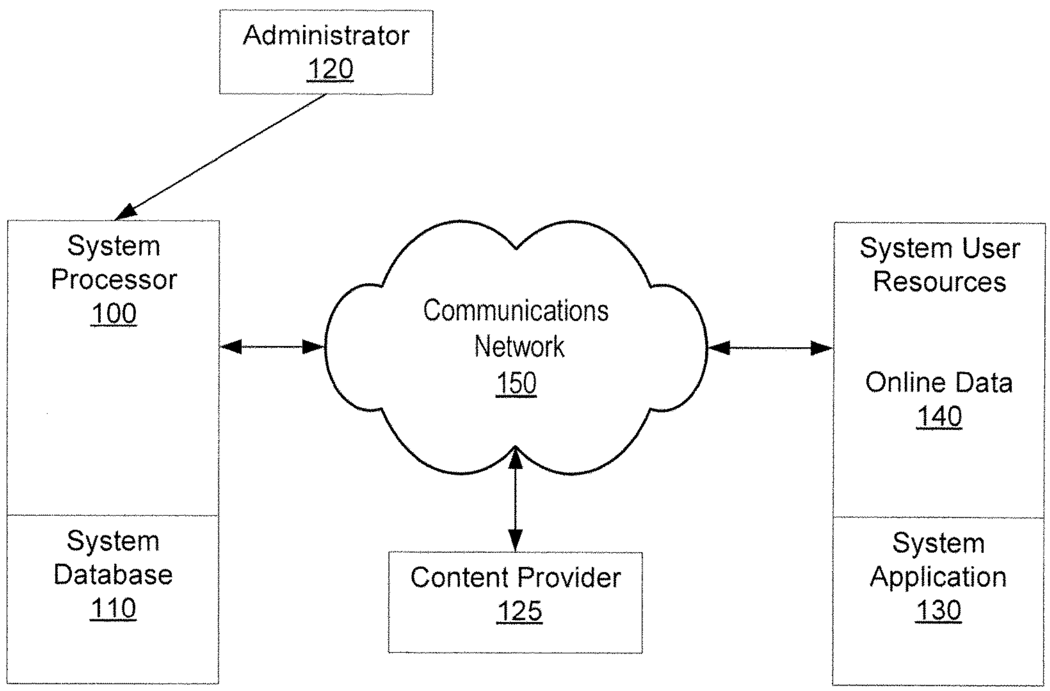
FIG. 1 illustrates a high-level data flow diagram associated with an embodiment of the invention.

FIG. 1 illustrates a high-level flow diagram of an embodiment of the present invention. The flow diagram illustrates the entities involved with managing, storing, configuring and transmitting the data exchanged by the system between entities using the AODSA tool. By way of example only, the system includes a system processor 100 and a system database 110 configured to store and manage user data (e.g., job applicant's data including resumes). As illustrated in FIG. 1, the system processor 100 and the system database 110 are situated remotely (e.g., on a remote server). However, it is to be understood that although these elements are implemented remotely, alternate embodiments may utilize a user's local resources (e.g., desktop CPU and/or hard drive) in coordination with a locally stored system application 130.

It is to be understood, that the invention will be discussed in the job application data submission context and that the invention may be configured for other implementations such as mortgage applications, bidding on real estate or other goods or services, applying for admission to schools or organizations, applying for internships or volunteer positions, applying for scholarships or grants, and/or the like. As illustrated in FIG. 1, the systemization 100/110 may include server-side functionality/processing that is accessed by a system user through system application 130 (e.g., a java-enabled applet running locally on a user's desktop). Alternately, the applet may run as a background task and is accessed when a system user (e.g., a job applicant) wants to submit application information in response to a job posting.

Alternately, system application 130 may be bundled as a software application that is situated locally and utilizes a computer's central processing unit as system processor 100 and a computer's hard drive as the system database 110. As will be described in greater detail below, online data content 140 may be viewable on a system user's computer through the use of a system application 130, such as a web browser. Such online data content 140 may, in one implementation, be presented to a user within the context of a content provider 125 website, such as in the form of a banner ad situated on a content provider's news web site.

On a high level, a user interacting with system application 130 browses online content 140 via communications network 150. When the user wants to submit job application data, system application 130 interacts with the system processor 100 and system database 110 over communications network 150 to access and forward the requested job application data associated with the system user.

FIGS. 2A, 2B, and 2C illustrate flow diagrams of the user data registration and profile creation processes. According to an embodiment of the invention, represented in FIG. 2A, the system user initiates the system application in step 210. The user selects either a manual registration 215 procedure or an automated registration 220 procedure. In the manual registration 215, the user manually enters job application data in step 225 including name, contact information, employment history and/or other identifying information. In step 245, the user may be presented with an option for assistance in creating a resume based on the entered data. According to one implementation, the system user may select a system resume template and an interactive data entry module. As part of the interactive data entry module, the system data entry application presents the user with a series a questions designed to extract certain user information that would appear on a resume or could be used to populate online employment application forms.

In some implementations, the system may present the user with an option to upload an electronic copy of a resume in step 245. The system application uploads and stores the information in the centralized system database in step 250. In some implementations, the system may be configured to transmit an acknowledgment message indicating the AODSA tool is ready for use, as in step 255.

Alternately, the user may select the automated registration process 220. The automated process starts with the user uploading an electronic copy of a resume and/or submission cover letter and indicating the corresponding file format in step 230. The system parses the resume and extracts data corresponding to database fields such as contact information, employment history, or education history in step 240. The system uploads the data to the system database in step 250 and in some implementations transmits an acknowledgment message in step 255 that the AODSA tool is ready for use.

FIG. 2B shows a logic flow in one embodiment of resume parsing and profile creation. At 260, the system receives a user resume, which is parsed at 265 for recognizable resume elements, such as but not limited to name, social security number, e-mail address, postal address, education, work experience, honors and awards, skills, and/or the like. In one implementation, the system may employ optical character recognition techniques in order to convert a resume submitted in an image format into a text format that may be manipulated and/or analyzed more conveniently. In an implementation, the converted resume may serve as the basis for creating a user portfolio of one or more customized resumes.

The system provides a great deal of flexibility and may be tailored to meet the needs of any number of system users. For example, the resume element recognition process may be implemented in a variety of different ways. In an implementation, terms extracted from the user resume may be compared against a database of known resume terms in order to identify resume elements or data field identifiers. In another implementation, only those terms from the user resume that appear in a special font (e.g., bold, underlined, italics, large font, etc.) are considered as possible resume field names. When a resume field name is detected, the system extracts field data associated with and/or proximate to that field name at 270. In one implementation, the system may detect a special character (e.g., a colon) after the field name and extract as field data any text after that character and before a carriage return, the next field name, and/or the like. Each detected field name is stored with its associated field data in a user profile record at 275. At 280, the system determines whether there are additional resume field names to consider and, if so, the flow returns to 265. Otherwise, the system proceeds to 285 where the user profile record is displayed to the user for approval 290. If the user is not satisfied, he or she is given the opportunity to edit user profile record fields at 295. Otherwise, the user profile record is persisted in a system database at 2100 for future use.

FIG. 2C shows detailed logic flow in another embodiment of profile and resume creation. At 2105, the system presents a user with a registration web form that may contain a plurality of questions and/or blank fields by which the user may enter personal information. At 2110, the system receives the user responses entered into the web form. A choice is presented to the user at 2115 as to whether or not he or she would like to generate a resume based on the information submitted at 2110. If not, the flow proceeds directly to 2150, wherein the entered user web form responses are persisted in a user profile record stored in a system database.

If a resume is desired, on the other hand, then the system may present the user with a plurality of resume template choices at 2120. These may, in one implementation, be in the form of example resumes and/or contain descriptions of the resume styles along with recommendations for appropriate situations in which to employ the various templates. The system receives a user selection of a particular resume template at 2125, populates resume fields in the template with user web form responses at 2130, and presents the resume for user inspection at 2135. The user indicates at 2140 whether or not he or she is satisfied with the resume in its current form and, if not, may be given the opportunity to edit resume fields at 2145. The completed resume is persisted as part of the user profile record at 2148, and the user is given the option to create new and/or alternate resumes at 2149. The user web form responses may be separately incorporated into the user profile record at 2150.

FIG. 3A illustrates a high level flow diagram of an autonomous automated data submission process associated with an embodiment of the invention. The system user browses online generic job listings in step 310. The user identifies a particular job listing that they want to pursue in step 320. The system user can then access the AODSA tool in step 330. Depending on the particular implementation, the AODSA tool may present the system user with a range of application data submission options (as discussed in greater detail in FIGS. 4A, 4B, 5A-5C and 6) in step 340. In step 350, after the system user selects a AODSA data submission component is selected, the AODSA tool accesses the user data on the centralized system and transmits the user data to the corresponding posting entity.

FIG. 3B illustrates a high level flow diagram of an embedded automated data submission process associated with an embodiment of the invention. The system user accesses a content provider website at 358. The content provider may be a system affiliated entity or otherwise provider with an agreement to display system tools to appropriate users. At 360, the content provider checks the user's computer for a cookie or other indication of user identity and/or system affiliation, based on which the content provider may determine eligibility or appropriateness of system tool distribution and/or display.

A determination is made at 370 whether or not an appropriate cookie exists and, if not, the automated data submission process may offer the user an opportunity to register for system participation 375. Should the user decide to do so, the system proceeds to a registration process such as that outlined in FIG. 2A. Otherwise, the system exits at 380 and no system tool is provided to the user. Otherwise, the content provider queries cookie contents at 390, such as user identifying information, user system identifying information, and/or the like. At 3100, the content provider forwards extracted cookie information to a system server, which processes that information in order to select system data for inclusion in a system web module. Depending on the implementation, the system may be configured to provides a wide variety of content/functionality to an identified system user. For example, the content provider may act as a gateway and provide access to a system user's full user account/functionality on the system (discussed in greater detail below in FIGS. 6 and 7). The content provider retrieves the system web module from the system 3110 and displays it to the user at 3120.

FIGS. 4A and 4B illustrate flow diagrams associated with form population and resume/cover letter generation processes, respectively. The system undertakes the steps shown in FIG. 4A when a user initiates application submission 401 involving an online data entry form. At 405, the system queries the name of the next empty web form field (e.g., name, social security number, work experience, education, etc.) and subsequently searches stored user profile information for a matching field entry 410. In one implementation, this is accomplished by scanning user profile information for character strings matching web form field names that have proximate, non-empty data entries.

At 415, a determination is made as to whether the current web form field exists in the user profile and, if not, that field is noted in a temporary record of empty web form fields. Otherwise, the data entry from the user profile that corresponds to the web form field is used to populate that field at 425. A determination is made at 430 if there are remaining empty web form fields to be filled and, if so, the system returns to 405. Otherwise, the system checks at 435 whether any of the missing web form fields noted at 420 are required for form submission. If so, the system may prompt the user for manual entry of data pertaining to those fields at 440. Alternately, in some implementations, the scan may include alternate field matching if a match is not identified (e.g., searching and entering address information in a field titled, "residence", if a field for "mailing address" is not matched). The completed form is submitted by the system at 445.

The system undertakes the steps shown in FIG. 4B when a user initiates application submission 450 involving resume and cover letter submission/generation. The system determines at 455 and 465 whether multiple cover letter and/or resume templates are available for the user to choose from and, if so, requests the user's selections at 460 and 470. Once unique cover letter and resume templates are selected, the system queries the name of an empty cover letter or resume field at 475. The system searches stored user profile information for a matching field entry 480 and, a determination is made at 490 whether a matching entry exists in the user profile. If not, the missing field is noted at 492, and if so, then the field is populated with the corresponding user profile information at 495.

The system determines whether additional empty resume/cover letter fields exist at 4100 and, if so, the system returns to 475. Otherwise, the system determines at 4105 whether the missing fields are required for generation of the resume or cover letter. If so, the system requests the user to enter data for those fields at 4110. Finally, the system generates the cover letter and resume based on the collected user profile information 4115, and submits them to the desired location at 4120. In an optional step 4118, the system may present the generated resume and/or cover letter for display to the user, who may then decide whether one or both are acceptable, or may choose to manually modify or supplement data included therein. At any point during this process, the user may save a current/modified resume to user at a future point as a template. Furthermore, the user may create a portfolio of these saved resumes for future user. This may be useful in creating a variety of resumes each with customized objectives (e.g., a general resume tailored for a software engineering position, a more specific resume highlighting certain experiences for a Java programming position, etc. . . . ).

In an alternative embodiment, instead of generating new cover letters and/or resumes in response to a user request for application submission, the system may store a selection of pre-made resumes and/or cover letters. The user may access, customize and save the pre-made resumes/cover letters and incorporate them into an application submission package.

Figure 5C:
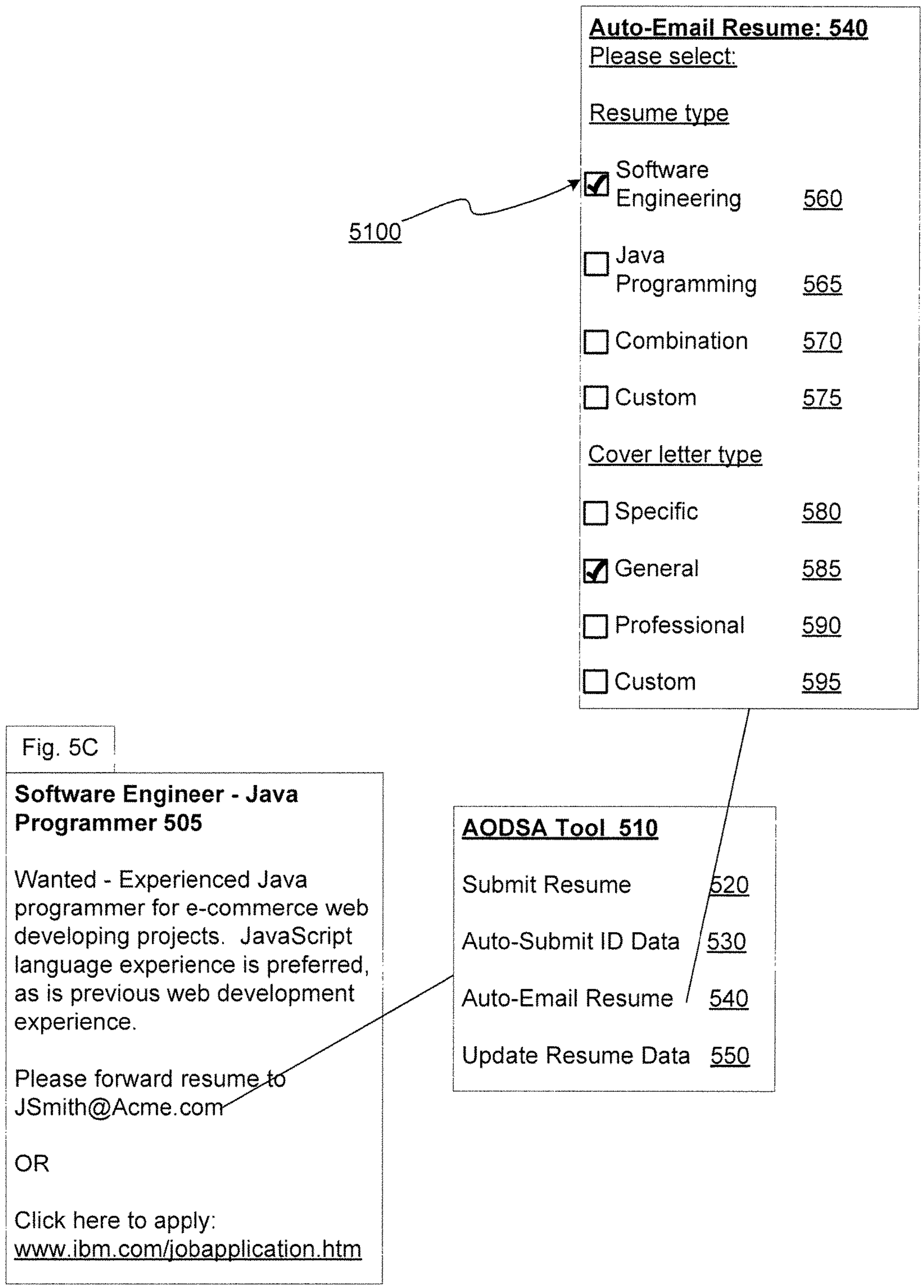

FIGS. 5A, 5B, and 5C illustrate examples of user invocations of the AODSA tool according to implementations of system application 130 (from FIG. 1). FIG. 5A illustrates an example generic data posting. By way of example only, FIG. 5A implements a generic job listing 500 that lists a series of current software engineering job opportunities 500. The generic job listing may be configured as a listing on a generic job listing repository, such as a web-based classified listing. Alternately, the generic job listing may be hosted by a particular company, and detail the current opportunities available within the company or a particular industry (e.g. jobs within IBM or within the Computer Programming Industry).

In FIG. 5B, the job applicant selects an internet hyper-link corresponding to a posted job 505 from job listing 500 in FIG. 5A. The user is then transferred to the corresponding web page (FIG. 5B) associated with the particular job description and can invoke the AODSA tool 510. The AODSA tool 510 provides a job applicant (or other system user) with a wide range of application data submission options, including an upload additional/redacted resume 510; auto-fill a form with identifying information option 520; auto-forward an email requesting additional information/forwarding a standardized job application cover letter with a resume attached 530; or an option to update/edit stored resume data 540.

After reviewing the opportunities detailed on the web page, the user may select the appropriate data submission and the user's data is retrieved from the AODSA centralized system and forwarded accordingly. According to the implementation illustrated in FIG. 5B, there are two primary user data transmission procedures (a) an online job application form auto-fill procedure 530; and (b) emailing a cover letter with a resume to an email recipient extracted from the data posting 540.

If AODSA component 530 is selected, in coordination with the "click here to apply" link, the AODSA tool may spawn a new browser window with the online form. The AODSA tool may be configured to retrieve the user's identifying information and attempt to auto-fill the elements of the form based on the user's data retrieved from the system database.

If AODSA component 540 is selected—the auto-email procedure—the AODSA tool may be configured to automatically email a user-selected resume and cover letter to a particular email address. Further, it is to be understood that in addition to submitting/updating resume data in AODSA components 520/550, the AODSA tool may be configured to assist the user in creating a number of stored cover letters to accompany the resume. Alternately, the AODSA tool may create an email with standardized employment application language with blanks that users can customize before the cover letter sending to the posting entity.

An embodiment of the auto-email interface is exhibited in FIG. 5C, wherein the user is requested to select from a portfolio of saved resumes and cover letters or pre-configured resume/cover letter templates. In this example, the resume selections are Software Engineering 560, Java Programming 565, combination 570, or custom 575, and the cover letter selections are specific 580, general 585, professional 590, or custom 595. Selection is made in this implementation by means of checkbox widgets 5100, though a variety of other interactive interface widgets are possible in other implementations. In one implementation, the user selects templates that are to be populated on the fly to generate cover letters and/or resumes, while in another embodiment, the user selects actual saved resumes and/or cover letters to be directly incorporated into application packages.

Figure 6:
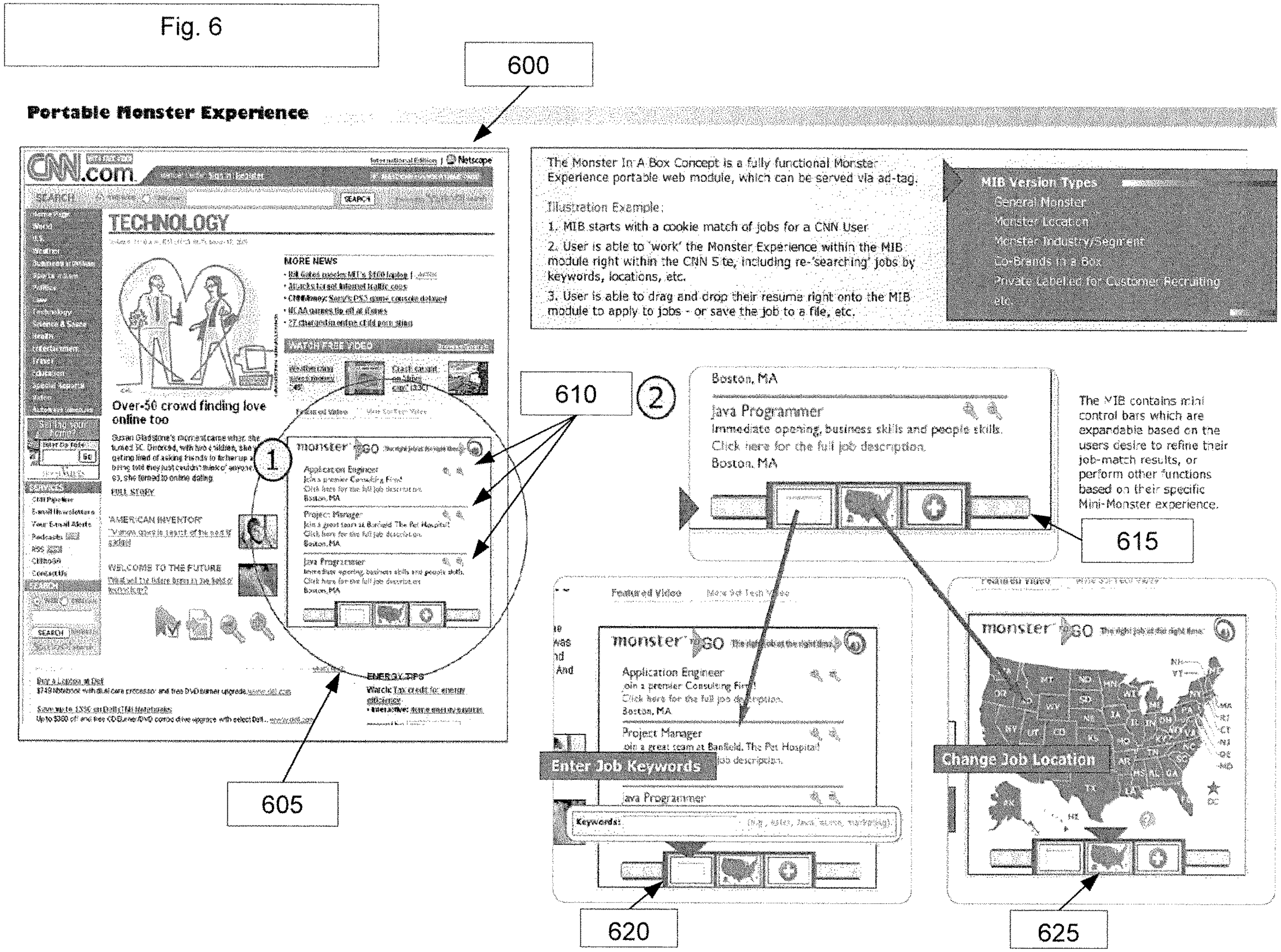
FIG. 6 illustrates an example of AODSA tool based on data served by an ad server protocol.

FIG. 6 illustrates an embodiment of the invention directed to serving AODSA functionality via an ad server as a portable web module embedded within a browser application. As illustrated, the user may surf the internet and access a particular website, for example a content providing 600. The AODSA tool may be incorporated into a partner's website, in an area of the website that has been set aside for advertisements 605.

In an implementation, the web module identifies the system user and access their full user data profile on an affiliate web site. The system user may be provided with full access to their user data profile and/or all of the functionality associated with the affiliate web site while using the content provider as an intermediary. For example, a web user registered with Monster.com accesses Content Provider CNN.com. The web user is identified by CNN.com as a registered Monster user and is provided access to their Monster.com account and/or Monster.com functionality (e.g., conducting job searches) without leaving the content provider's web site.

The AODSA tool is a fully functional portable web module, in which content can be served via as an online advertisement (e.g., via ad-tag). Accordingly, the portable web module may be configured to recognize a system user through a matching user data stored locally such as via a cookie. The system may then generate a customized list of jobs for a particular system user, which are then displayed for the system user as content within the portable web module. This process is illustrated in greater detail in FIG. 3B. The portable web module may be configured with a control bar 615 to facilitate system user interaction with the AODSA tool set.

Depending on the particular implementation, the control bar 615 may be configured with additional job listing data presentation components. By way of example only, the control bar 615 may be configured to facilitate additional system user driven keyword searching within a designated system database. In some implementations, the user can change the geographic focus 625 of a key word search. In such implementation additional data entry windows 620, 625 may be spawned in order to facilitate user interaction.

Although FIG. 6 illustrates an embodiment directed to presenting certain job listings selected from a general jobs database, it is to be understood that this discussion is simply for purposes of illustration. The actual implementation may be further adapted to meet the needs of a particular application.

By way of example only, the portable web module AODSA implementation may be configured to facilitate general job listing search functionality, based on key words, search terms, company names, industries, geographical areas, experience and/or educational levels, skills, salary range, and/or the like. Alternately, the displayed content may be customized according to settings established by a particular system user to display certain categories of jobs within a particular location, associated with a particular industry/job segment, user-defined salary range or other user-defined display parameter. It is to be understood that in additional embodiments of the invention, the portable web module may be further customized to illustrate listings associated with a co-brand and/or partner posting entity. Moreover, the portable web module may be adapted for private labeled postings to conduct customer recruiting.

Figure 7:
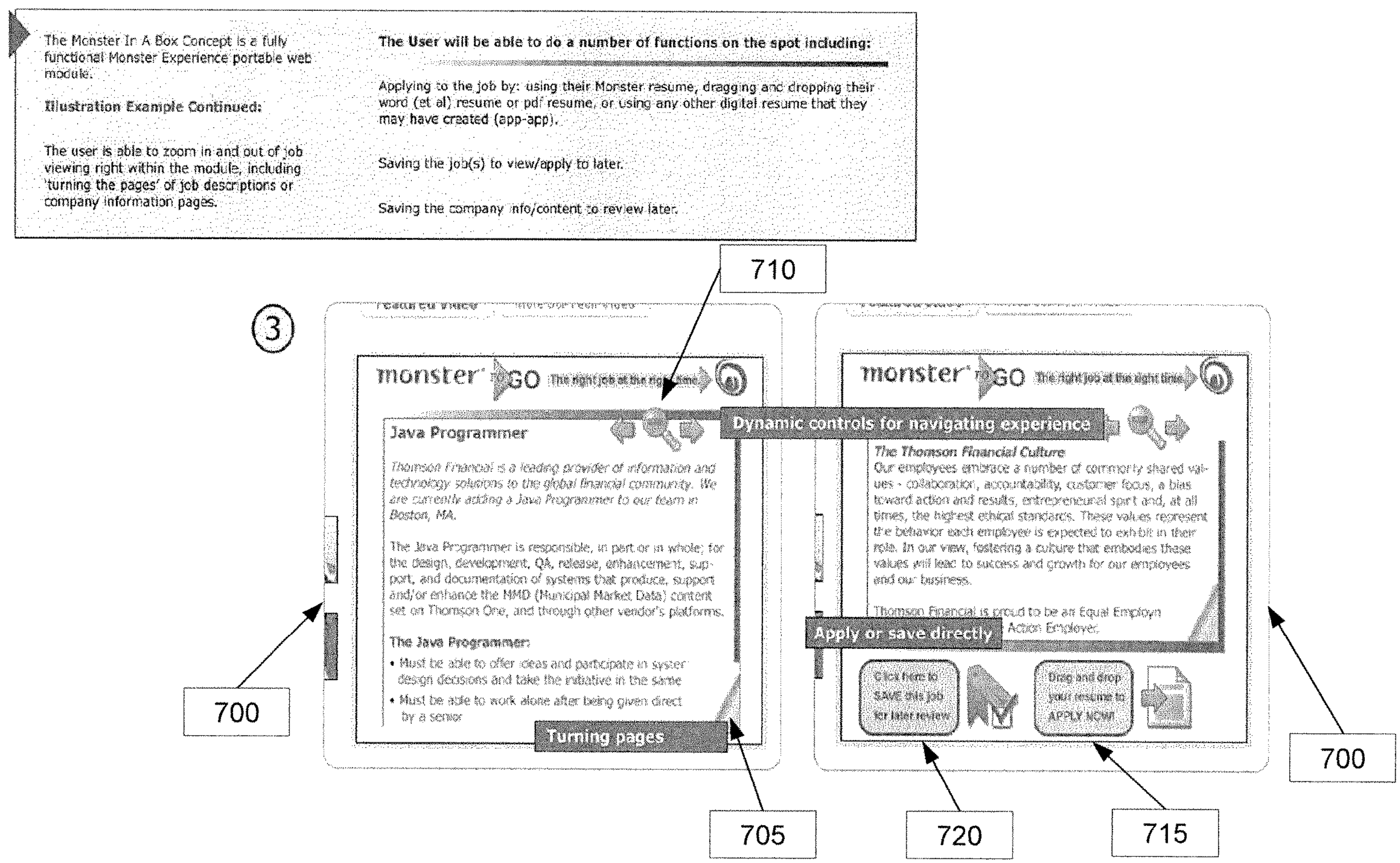
FIG. 7 illustrates additional aspects of the ad server AODSA tool illustrated in FIG. 6.

The portable web module AODSA tool 700 also may be configured to provide functionality similar to that described in FIGS. 5A, 5B, and 5C. By way of example only, FIG. 7 illustrates the AODSA tool portable web module 700 adapted to interact with the system user.

In an implementation, the user may select a particular listing 610 from FIG. 6. As illustrated, upon selection of a listing 610, the portable web module 700 retrieves and displays additional data associated with the listing 610. Depending on the amount of detail for the listing, the portable web module may be configured to facilitate page browsing, wherein the user clicks an "advance" portion of the display 705 to "turn the pages" of the displayed data associated with the posting 610. The portable web module may include a listing browsing functionality button 710 that enables a system user to navigate between detailed descriptions of the job listings 610 at a granular level (i.e., where detailed listing data associated with a single listing is displayed to a system user).

In some embodiments, the portable web module may also be configured with auto resume submission 715, listing auto-fill functionality (similar to the functionality discussed above in FIGS. 5B and 5C), and/or a listing bookmark feature 720 that saves the selected job listing/company information/content to a system user data profile for review at a later time.

In an embodiment, the portable web module is configured to facilitate resume submission for a displayed job listing 610. Depending on the implementation, the user may simply drag and drop an electronic resume 715 (e.g., resume formatted as a Microsoft word document, a .PDF file, or any other number of formats of digital resume data) from a desktop or a file folder to the portable web module in order to facilitate the application process. Alternately, the portable web module may be adapted for the data submission processes and/or resume/cover letter creation processes associated with FIGS. 5B and 5C and discussed above.

AODSA Controller

Figure 8:
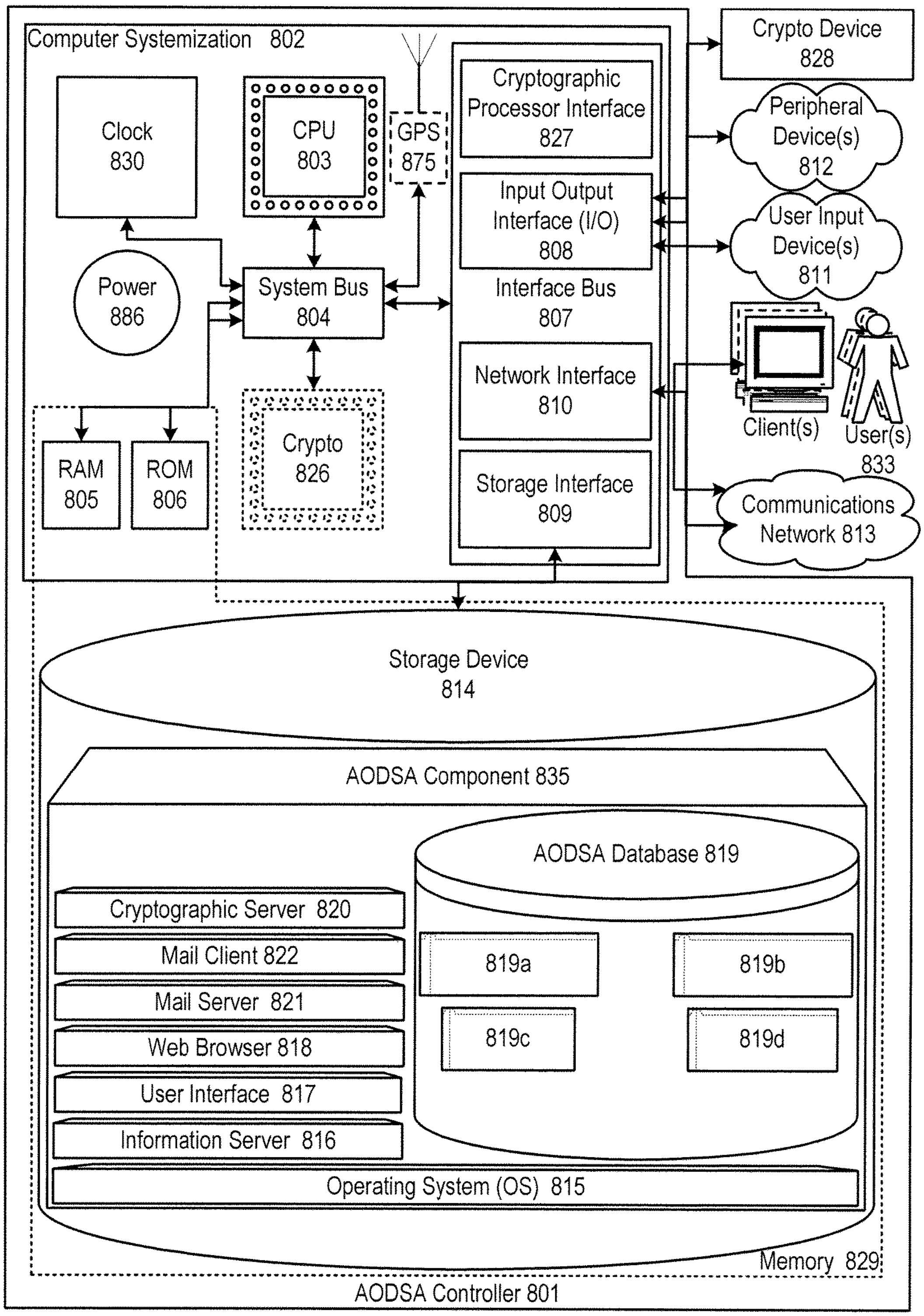
FIG. 8 exhibits illustrates aspects of an implementation of an AODSA controller.

The data submission functionality described above can be embodied by an Automated Online Data Submission/Application ("AODSA") controller 801. FIG. 8 of the present disclosure exhibits illustrates inventive aspects of the AODSA controller 801 in a block diagram. In this embodiment, the AODSA controller 801 may serve to generate, manage, price, sell, match, display, serve, and distribute advertisements.

Computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the AODSA controller 801 may be connected to and/or communicate with entities such as, but not limited to: one or more users from user input devices 811; peripheral devices 812; a cryptographic processor device 828; and/or a communications network 813.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The AODSA controller 801 may be based on common computer systems that may comprise, but are not limited to, components such as: a computer systemization 802 connected to memory 829.

Computer Systemization

A computer systemization 802 may comprise a clock 830, central processing unit (CPU) 803, a read only memory (ROM) 806, a random access memory (RAM) 805, and/or an interface bus 807, and most frequently, although not necessarily, are all interconnected and/or communicating through a system bus 804. Optionally, the computer systemization may be connected to an internal power source 886. Optionally, a cryptographic processor 826 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the AODSA controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 886 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the AODSA thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics AODSAers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the AODSA controller is accessible through remote clients 833*b* (e.g., computers with web browsers) by users 833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 811 may be card readers, dongles, finger print readers, gloves, graphics tablets, joysticks, keyboards, mouse (mice), remote controls, retina readers, trackballs, trackpads, and/or the like.

Peripheral devices 812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the AODSA controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the AODSA controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 740 MHz Roadrunner.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the AODSA controller and/or a computer systemization may employ various forms of memory 829. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 829 will include ROM 806, RAM 805, and a storage device 814. A storage device 714 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 829 may contain a collection of program and/or database modules and/or data such as, but not limited to: operating system module(s) 815 (operating system); information server module(s) 816 (information server); user interface module(s) 817 (user interface); Web browser module(s) 818 (Web browser); database(s) 819; cryptographic server module(s) 820 (cryptographic server); the AODSA module(s) 835; and/or the like (i.e., collectively a module collection). These modules may be stored and accessed from the storage devices and/or from storage devices accessible through an interface bus. Although non-conventional software modules such as those in the module collection, typically, are stored in a local storage device 814, they may also be loaded and/or stored in memory such as: peripheral devices, RAM, remote storage facilities through a communications network, ROM, various forms of memory, and/or the like.

Operating System

The operating system module 815 is executable program code facilitating the operation of the AODSA controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the AODSA controller to communicate with other entities through a communications network 813. Various communication protocols may be used by the AODSA controller as a subcarrier transport mechanism for interaction, such as, but not limited to: multicast, TCP/IP, UDP, unicast, and/or the like.

Information Server

An information server module 816 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the AODSA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 821, and/or the like. An information server may communicate to and/or with other modules in a module collection, including itself, and/or facilities of the like. Most frequently, the information server communicates with the AODSA database 819, operating systems, other program modules, user interfaces, Web browsers, and/or the like.

Access to the AODSA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the AODSA. In one embodiment, the information server would provide a Web form accessible by a Web browser. Entries made into supplied fields in the Web form are tagged as having been entered into the particular fields, and parsed as such. The entered terms are then passed along with the field tags which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the AODSA as a query. Upon generating query results from the query, the results are passed over the bridge mechanism, and may be parsed for formatting and generation of a new results Web page by the bridge mechanism.

Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 817 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 818 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the AODSA enabled nodes. The combined application may be nugatory on systems employing standard Web browsers.

Cryptographic Server

A cryptographic server module 820 is stored program code that is executed by the CPU 803, cryptographic processor 826, cryptographic processor interface 827, cryptographic processor device 828, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the AODSA may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the AODSA module to engage in secure transactions if so desired. The cryptographic module facilitates the secure accessing of resources on the AODSA and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The AODSA Database

The AODSA database module 819 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the AODSA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the AODSA database is implemented as a data-structure, the use of the AODSA database 819 may be integrated into another module such as the AODSA module 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 819 includes several tables 819*a-d*. A job listings table 819*a* includes fields such as, but not limited to: job listing ID, job title, description, company, location, salary, required experience and/or education, and/or the like. A user profile table 819*b* includes fields such as, but not limited to: user ID, name, address, social security number, e-mail address, education, job experience, skills, references, honors and/or awards, publications, resume and/or CV, and/or the like. A templates table 819*c* includes fields such as, but not limited to: template ID, template display name, template category (e.g., cover letter, resume, CV, etc.), template file location, and/or the like. A content provider table 819*d* includes fields such as, but not limited to: content provider ID, content provider name, AODSA module format restrictions, AODSA module serving conditions, and/or the like.

In one embodiment, the AODSA database may interact with other database systems. For example, employing a distributed database system, queries and data access by the AODSA modules may treat the combination of the AODSA database and other databases as a single database entity. In one embodiment, aspects of AODSA functionality may be configured on one or more server-side computing systems while, in another embodiment, aspects of AODSA functionality may be configured to operate on one or more client-side computing systems.

In one embodiment, user programs may contain various user interface primitives, which may serve to update the AODSA. Also, various accounts may require custom database tables depending upon the environments and the types of clients the AODSA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 819*a-d*. The AODSA may be configured to keep track of various settings, inputs, and parameters via database controllers.

The AODSA database may communicate to and/or with other modules in a module collection, including itself, and/or facilities of the like. Most frequently, the AODSA database communicates with the AODSA module, other program modules, and/or the like. The database may contain, retain, and provide information regarding other nodes and data.

The AODSA

The AODSA module 835 is stored program code that is executed by the CPU. The AODSA affects accessing, obtaining and the provision of information, services, transactions, and/or the like across various communications networks.

The AODSA module enables generation of transactions for investors to contribute to such various asset funds and achieve investment fund optimizations for such exchanges.

The AODSA module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the AODSA server employs a cryptographic server to encrypt and decrypt communications. The AODSA module may communicate to and/or with other modules in a module collection, including itself, and/or facilities of the like. Most frequently, the AODSA module communicates with the AODSA database, operating systems, other program modules, and/or the like. The AODSA may contain, communicate, generate, obtain, and/or provide program module, system, user, and/or data communications, requests, and/or responses.

Distributed AODSA

The structure and/or operation of any of the AODSA node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the AODSA controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles.

It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for facilitating data submission comprising:

receiving via a processor an indication that a user of an employment service is browsing a non-employment-related website;

determining that a cookie associated with the employment service exists;

extracting an identifier from the cookie resolvable to a user account;

effecting the forwarding of user account information to the employment service based on the resolved account identifier from the cookie, providing account access to the user account information associated with the cookie;

displaying a portable web module on the non-employment-related website, the portable web module containing job postings data from the employment service;

wherein the job postings data in the portable web module is updated based on the content of the non-employment-related website;

receiving a request for job-specific data from a user interacting with the portable web module;

retrieving from a data storage module the requested job-specific data;

updating the content within the portable web module based on the retrieved job-specific data without updating the content of a non-employment-related webpage, wherein the non-employment related webpage is hosted on the non-employment-related-website; and actuation of the portable web module to forward user-provided data to an employment entity associated with the job-specific data without the user leaving the non-employment-related webpage;

wherein the user-provided data comprises job application data, user data extracted from a resume, and details about a job posting and an employer associated with a job posting.

2. The method of claim 1, wherein the user-provided data comprises job application data.

3. The method of claim 1, wherein the user-provided data comprises user data extracted from a resume.

4. The method of claim 1, wherein the job-specific data comprises details about a job posting and an employer associated with a job posting.

5. The method of claim 1, wherein the job posting data in the portable web module is updated based on the content of the non-employment-related website.

6. An apparatus for facilitating data submission comprising:

a memory; and a processor disposed in communication with said memory, and configured to issue a plurality of processing instructions stored in the memory, wherein the process issues instructions to:

receive via processor an indication that a user of an employment service is browsing a non-employment-related website;

determine that a cookie associated with the employment service exists;

extract an identifier from the cookie resolvable to a user account;

effect the forwarding of user account information to the employment service based on the resolved account identifier from the cookie, provide account access to the user account information associated with the cookie;

display a portable web module on the non-employment-related website, the portable web module containing job postings data from the employment service;

receive a request for job-specific data from a user interacting with the portable web module;

retrieve from a data storage module the requested job-specific data;

update the content within the portable web module based on the retrieved job-specific data without updating the content of a non-employment-related webpage, wherein the non-employment related webpage is hosted on the non-employment-related-website; and actuating the portable web module to forward user-provided data to an employment entity associated with the job-specific data without the user leaving the non-employment-related webpage.

7. The apparatus of claim 6, wherein the user-provided data comprises job application data.

8. The apparatus of claim 6, wherein the user-provided data comprises user data extracted from a resume.

9. The apparatus of claim 6, wherein the job-specific data comprises details about a job posting and an employer associated with a job posting.

10. The apparatus of claim 6, wherein the job posting data in the portable web module is updated based on the content of the non-employment-related website.

11. A processor-readable non-transient storing processor-executable components for facilitating data submission, comprising:

a component collection stored in the medium, wherein the component collection, stored in the medium, includes processor-issuable instructions to:

receive via processor an indication that a user of an employment service is browsing a non-employment-related website;

determine that a cookie associated with the employment service exists;

extract an identifier from the cookie resolvable to a user account;

effect the forwarding of user account information to the employment service based on the resolved account identifier from the cookie, provide account access to the user account information associated with the cookie;

display a portable web module on the non-employment-related website, the portable web module containing job postings data from the employment service;

receive a request for job-specific data from a user interacting with the portable web module;

retrieve from a data storage module the requested job-specific data;

update the content within the portable web module based on the retrieved job-specific data without updating the content of a non-employment-related webpage, wherein the non-employment related webpage is hosted on the non-employment-related-website; and actuating the portable web module to forward user-provided data to an employment entity associated with the job-specific data without the user leaving the non-employment-related webpage.

12. The processor-readable non-transient storing processor-executable components for facilitating data submission of claim 11, wherein the user-provided data comprises job application data.

13. The processor-readable non-transient storing processor-executable components for facilitating data submission of claim 11, wherein the user-provided data comprises user data extracted from a resume.

14. The processor-readable non-transient storing processor-executable components for facilitating data submission of claim 11, wherein the job-specific data comprises details about a job posting and an employer associated with a job posting.

15. The processor-readable non-transient storing processor-executable components for facilitating data submission of claim 11, wherein the job posting data in the portable web module is updated based on the content of the non-employment-related website.

* * * * *